United States Patent [19]
Murray et al.

[11] Patent Number: 4,796,006
[45] Date of Patent: Jan. 3, 1989

[54] ANALOG OUTPUT SYSTEM COMPATIBLE WITH DIGITAL SYSTEM BUS

[75] Inventors: Kenneth W. Murray, Knightsridge; Joseph Purvis, Deans, both of Scotland

[73] Assignee: Burr-Brown Limited, Livingston, Scotland

[21] Appl. No.: 932,678

[22] Filed: Nov. 20, 1986

[30] Foreign Application Priority Data

Aug. 19, 1986 [GB] United Kingdom ............... 8620122

[51] Int. Cl.$^4$ ............................................. H03M 1/66
[52] U.S. Cl. ................................................... 341/144
[58] Field of Search .................................. 340/347 DA

[56] References Cited
U.S. PATENT DOCUMENTS

| | | | |
|---|---|---|---|
| 4,202,042 | 5/1980 | Connors | 340/347 DA |
| 4,353,058 | 10/1982 | Sacks | 340/347 DA |

OTHER PUBLICATIONS
Schoenfeld "Computer" May 1977, pp. 56–67.

Primary Examiner—Charles D. Miller
Attorney, Agent, or Firm—Victor Flores

[57] ABSTRACT

An analog output system coupled to a digital system bus (1, FIG. 1) comprises a RAM (8) in which digital data may be input from the system bus. The data is converted into analog form by digital-to-analog converters (30–37) in either continuous mode or intermittent mode, depending upon the contents of control/status register (18). The system also comprises interrupt logic (6), bus arbitration control logic (16), and reconstruction filters (40–47). A watchdog timer (50) zeroes all outputs which have not been accessed via the system bus (1) within a specified time period. The conversion rate can be controlled either by an internal timer (52) or by an external trigger (57). The output channel configuration and conversion frequency are fully software programmable.

9 Claims, 24 Drawing Sheets

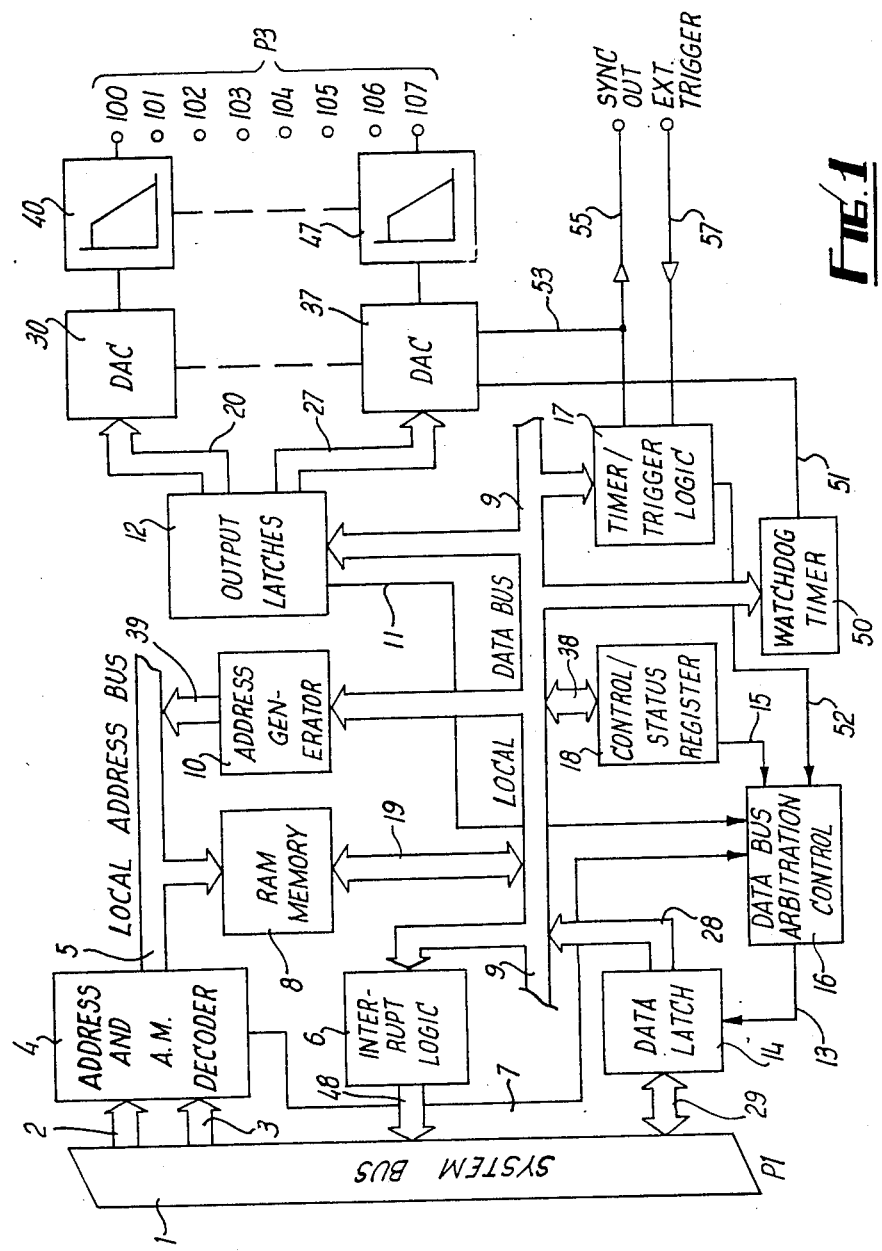

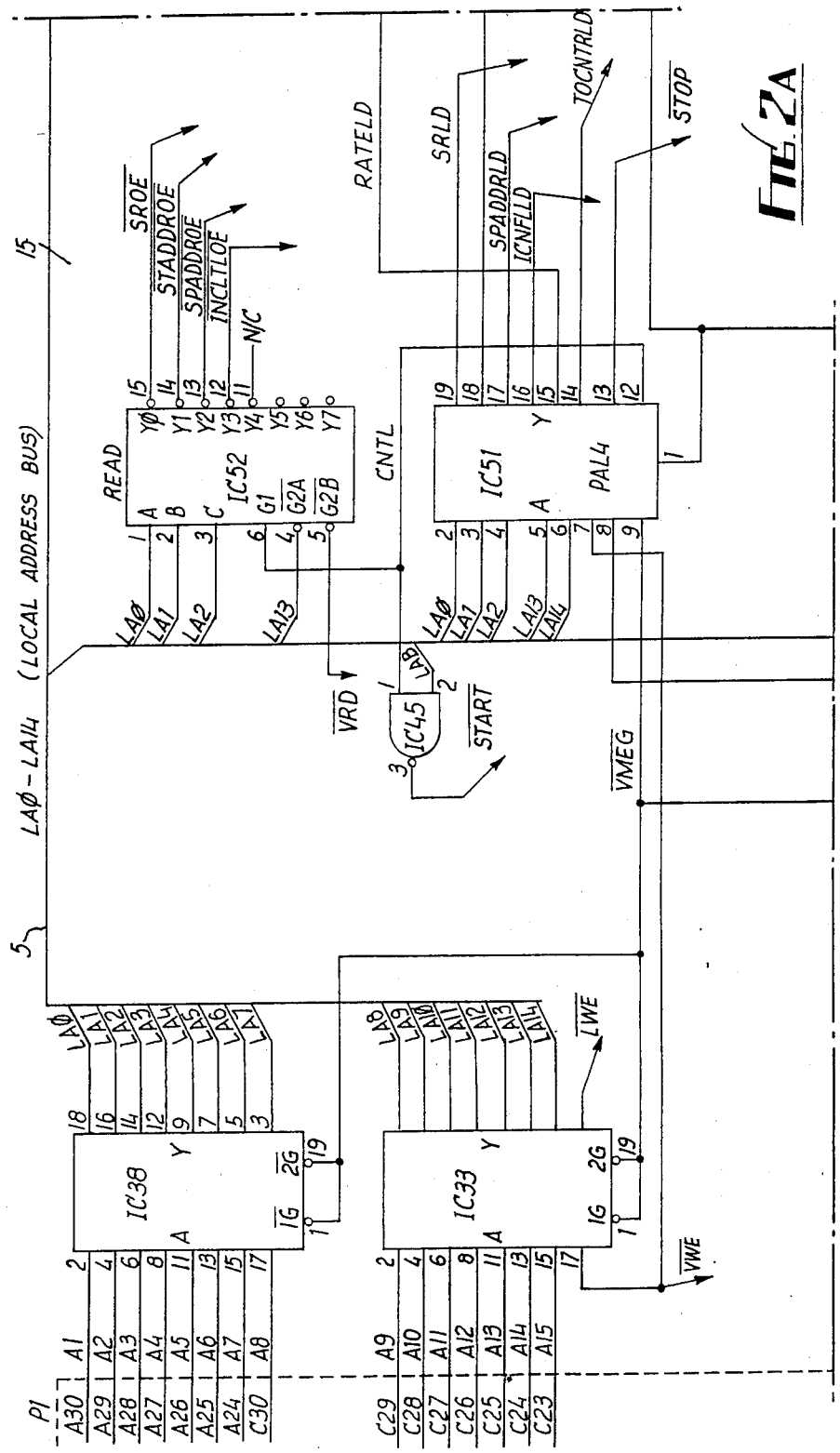

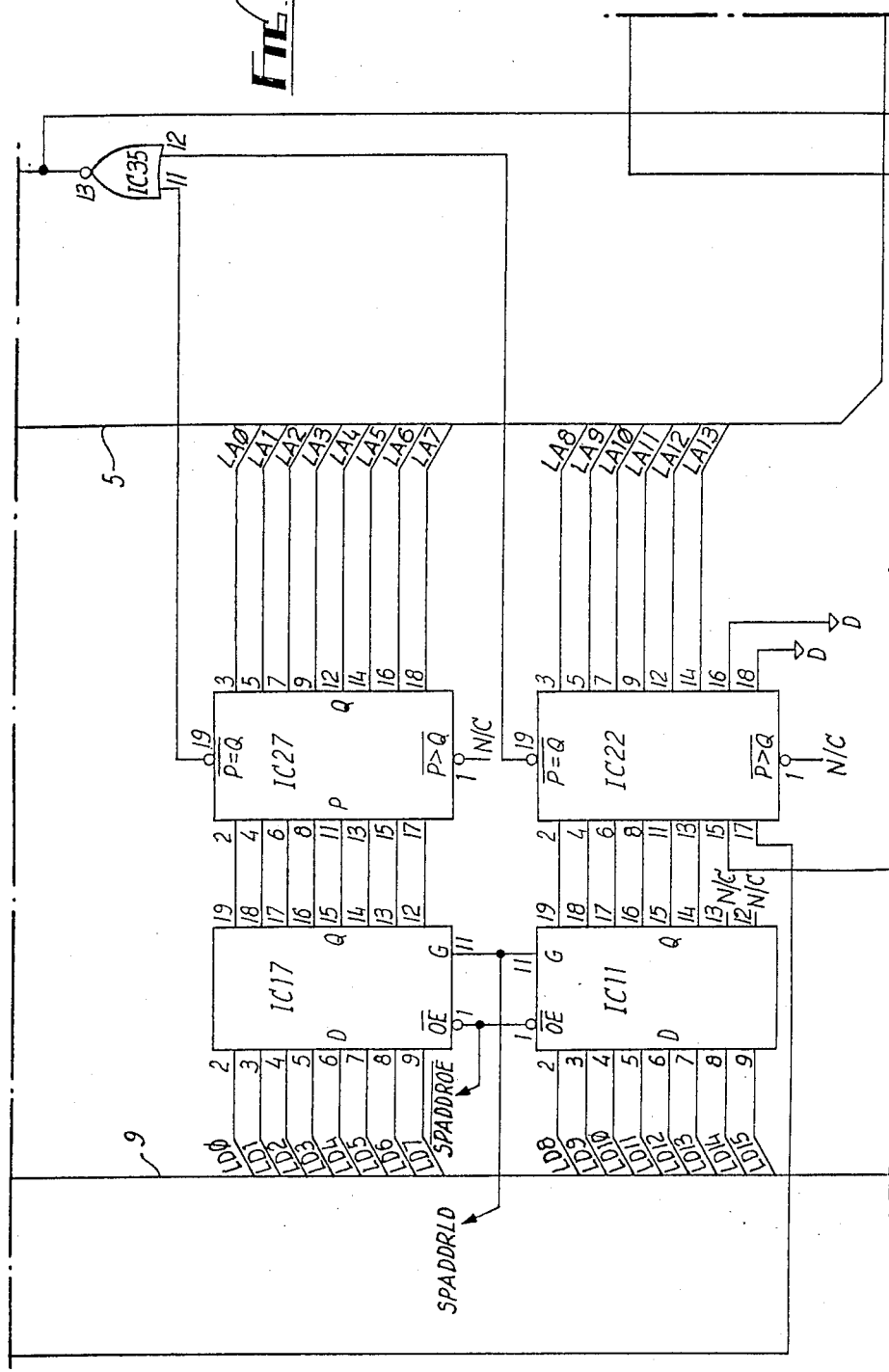

| Fig.2K | Fig.2L | |
| --- | --- | --- |
| | Fig.2I | Fig.2J |
| Fig.2H | | |
| Fig.2E | Fig.2F | Fig.2G |
| Fig.2A | Fig.2B | Fig.2C | Fig.2D |

*Fig.3*

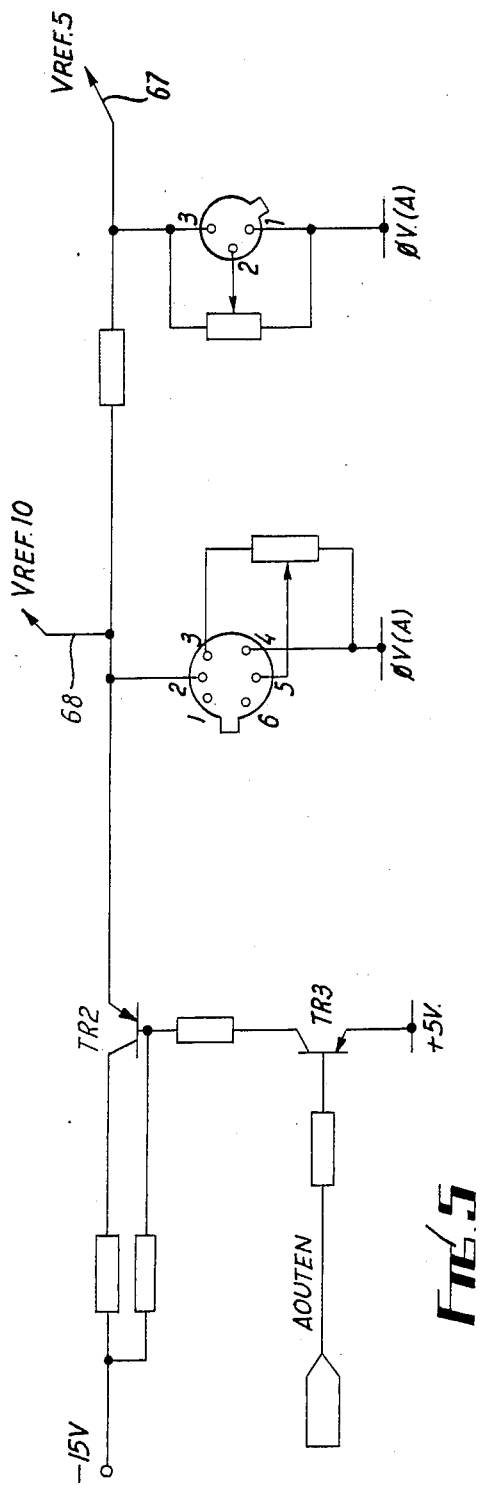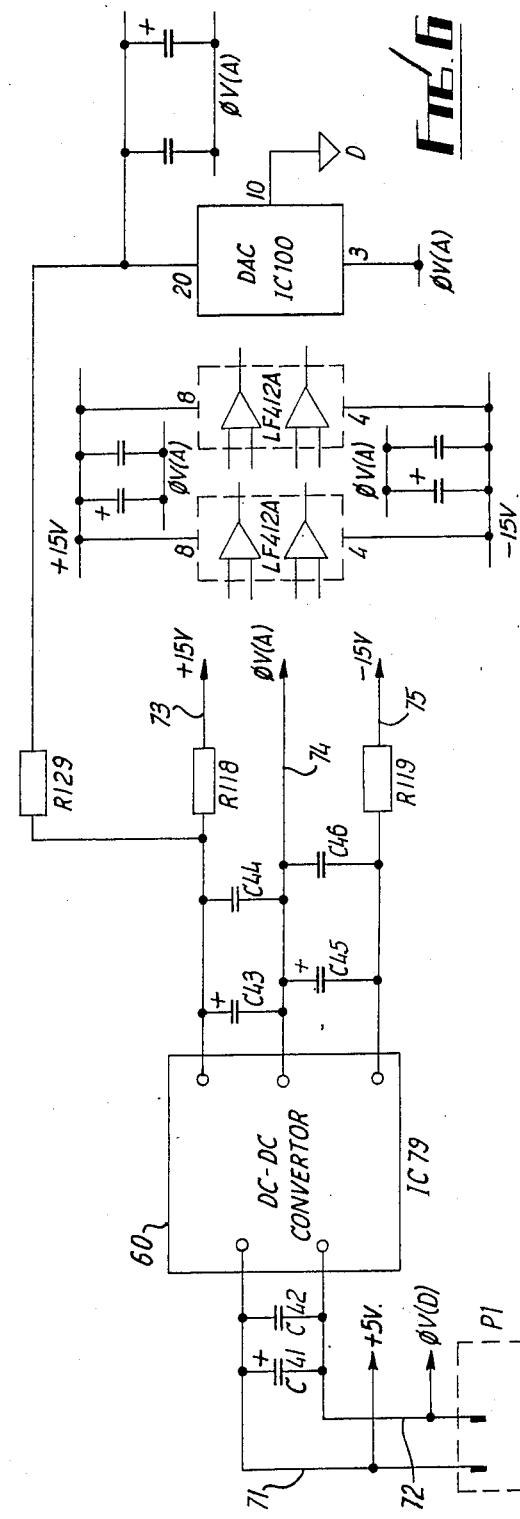

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| ////| ////| ////| ////| OVER. SAM? | CYC. FIN. | TOUT | HALT | ////| CHANNEL SELECT | | | $\overline{TOU}$/TEN | $\overline{CONT}$/ONE | EVENT | $\overline{INT.}$/EXT. |

FIG. 10

| D6 | D5 | D4 | CHANNEL(S) SELECTED |
|---|---|---|---|
| 0 | 0 | 0 | CH 0 |
| 0 | 0 | 1 | CH 0,1 |
| 0 | 1 | 0 | CH 0,1,2 |
| 0 | 1 | 1 | CH 0,1,2,3 |
| 1 | 0 | 0 | CH 0,1,2,3,4 |
| 1 | 0 | 1 | CH 0,1,2,3,4,5 |
| 1 | 1 | 0 | CH 0,1,2,3,4,5,6 |
| 1 | 1 | 1 | CH 0,1,2,3,4,5,6,7 |

FIG. 11

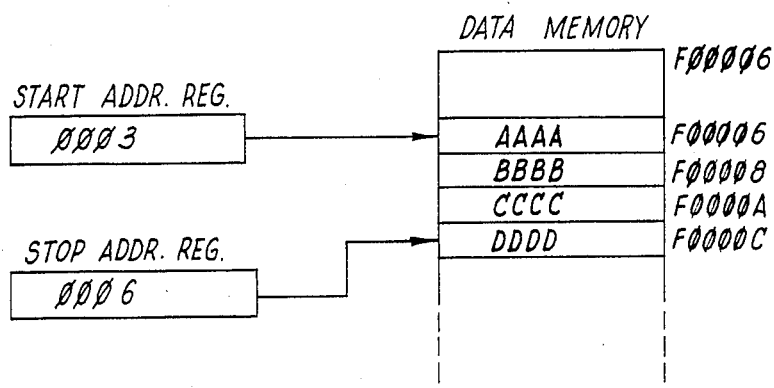
_FIG. 12_
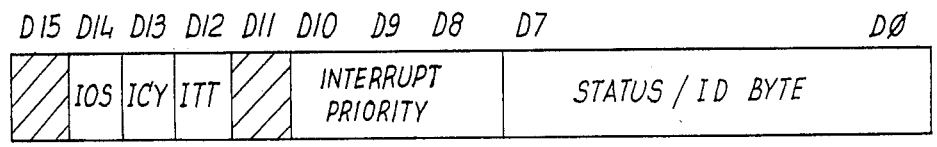
_FIG. 13_
| D10 | D9 | D8 | INTERRUPT REQUEST LINE |
|---|---|---|---|
| 0 | 0 | 1 | IRQ1* |
| 0 | 1 | 0 | IRQ2* |
| 0 | 1 | 1 | IRQ3* |
| 1 | 0 | 0 | IRQ4* |
| 1 | 0 | 1 | IRQ5* |
| 1 | 1 | 0 | IRQ6* |
| 1 | 1 | 1 | IRQ7* |
_FIG. 14_

ANALOG OUTPUT SYSTEM COMPATIBLE WITH DIGITAL SYSTEM BUS

TECHNICAL FIELD

This invention relates generally to digital-to-analog conversion, and, in particular, to a high speed analog output system which is fully compatible with the system bus of a digital data processing system.

BACKGROUND OF THE INVENTION

The present invention concerns an improvement in a data conversion system. Many types of circuits are known for converting a digital signal into an analog signal of similar or equivalent value.

However, there is an urgent need in this technology to provide a digital-to-analog conversion system which interfaces in an efficient, yet function-rich and flexible manner with the system bus of a digital data processing system. The commercially available VME bus is one widely known example of such a system bus.

BRIEF SUMMARY OF INVENTION

Accordingly, is an object of the present invention to provide an improved digital-to-analog conversion system.

It is also an object of the present invention to provide a digital-to-analog conversion system with an intelligent interface between such system and the system bus of a digital data processing system.

It is a further object of the present invention to provide a digital-to-analog conversion system in which the rate of conversion can be varied under software control.

It is yet another object of the present invention to provide a digital-to-analog conversion system in which the number of active output channels can be varied under software control.

It is also an object of the present invention to provide a digital-to-analog conversion system with a random access memory for temporarily storing digital data with respect to which the starting and stopping addresses may be selected.

It is still further an object of the present invention to provide a digital-to-analog conversion system in which the conversion can be triggered by either an internally or externally generated signal.

It is additionally an object of the present invention to provide a digital-to-analog conversion system in which the period of an internally generated trigger signal may be varied.

A further object of the present invention to provide a digital-to-analog conversion system in which all output channels may be reset to zero after a predetermined time of inactivity.

Another object of the present invention to provide a digital-to-analog conversion system which performs conversions either in a one-shot or in a continuous mode.

Still another object of the present invention to provide a digital-to-analog conversion system in which its internal data and address busses can be synchronized with the data and address busses of a digital data processing system bus.

It is also an object of the present invention to provide a digital-to-analog conversion system in which both the prioritization of the interrupt signals which are generated as well as the types of conditions giving rise to such interrupt signals can be varied under software control.

It is moreover an object of the present invention to provide a digital-to-analog conversion system in which each output channel is provided with a reconstruction filter.

These and other objects are achieved in accordance with a preferred embodiment of the invention by providing a digital-to-analog conversion system coupled to a digital system bus for converting at least one digital signal input via the bus into an analog signal of proportionate value, such system comprising random access memory means for temporarily storing the digital signal, interface means for coupling the random access memory to the bus, and at least one digital-to-analog conversion circuit for converting the digital signal into the analog signal.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 shows a block diagram illustrating a preferred embodiment of the conversion system of the present invention.

FIGS. 2A–2L together show a detailed circuit schematic of the digital portion of a preferred embodiment of the conversion system of the present invention.

FIG. 3 shows how FIGS. 2A–2L should be arranged to form the detailed circuit schematic of the digital portion of the conversion system of the present invention.

FIG. 5 shows a voltage reference supply circuit for the conversion system of the present invention.

FIG. 6 shows an additional voltage reference supply circuit for the analog portion of the conversion system of the present invention.

FIG. 10 shows the control/status register of FIG. 9 in greater detail.

FIG. 11 shows how the output channel is selected as a function of the channel select bit values.

FIG. 12 illustrates the operation of the start address register and the stop address register.

FIG. 13 shows the format of the interrupt control register of the conversion system of the present invention.

FIG. 14 illustrates how the interrupt priority is selected as a function of the interrupt priority bit values.

DETAILED DESCRIPTION OF THE INVENTION

Figure 2B:
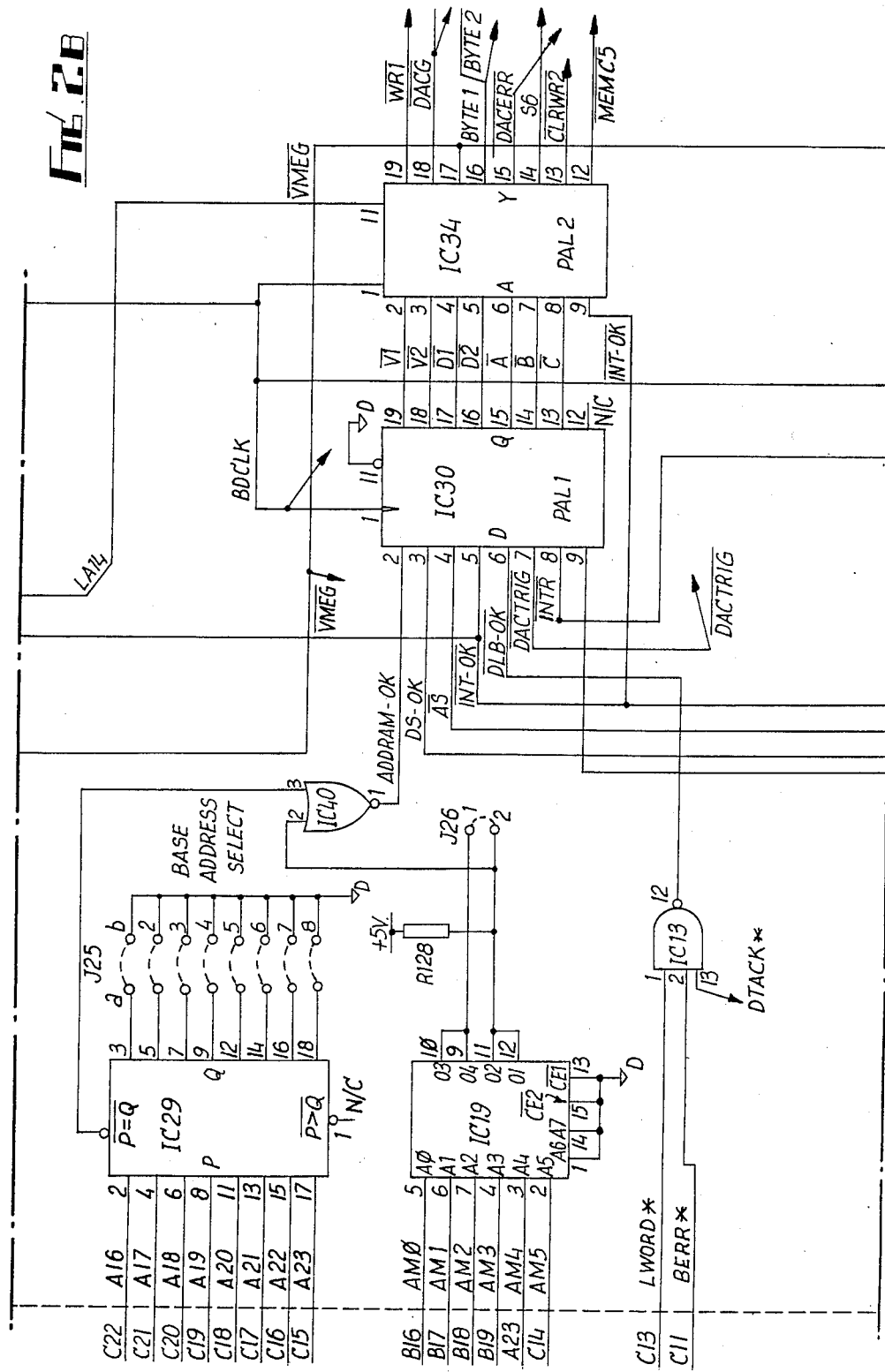

Referring now to FIG. 1, a block diagram illustrating a preferred embodiment of the conversion system of the present invention is shown.

In the left-hand portion of FIG. 1, the system bus 1 of a digital data processing system may take the form, for example, of the widely used VME bus, which comprises data, address, and control lines (not illustrated). To the right side of FIG. 1 appear digital-to-analog circuits 30–37 and their associated reconstruction output filters 40–47, each coupled to an analog output terminal 100–107.

Coupled to system bus 1 via bus portions 2 and 3 is an address and address modifier (A.M.) decoder 4, which in turn is coupled to local address bus 5. Coupled to local address bus 5 is a random access memory (RAM) 8, which in a preferred embodiment is 16K by 12 bytes in size. RAM 8 is coupled to local data bus 9 via bus portion 19.

An address generator 10 is coupled to local data bus 9 and to local address bus 5. A set of output latches 12 is coupled to local data bus 9. A respective output latch is coupled to each one of the digital-to-analog converter circuits 30–37 via a respective bus portion 20–27.

Also coupled to the local data bus 9 is interrupt logic 6, which is coupled to the system bus 1 via bus portion 48. A data latch 14 is coupled to the system bus 1 via bus portion 29 and is also coupled to the local data bus 9 via bus portion 28.

A control/status register 18 is coupled to the local data bus 9 via bus portion 38 and is also coupled to a data bus arbitration control circuit 16 via control line 15. Data bus arbitration control circuit is coupled to data latch 14 via control line 13, to address and A.M. decoder 4 via control line 7, to the output latches via control line 11, and to timer/trigger logic 17 via control line 52.

Timer/trigger logic 17 is also coupled to local data bus 9, to a Sync Out terminal via line 55, and to an External Trigger terminal via line 57.

Watchdog timer circuit 50 is coupled to local data bus 9 and to the digital-to-analog conversion circuits 30–37 via control line 51. The digital-to-analog conversion circuits 30–37 are also coupled to line 55 via control line 53.

Referring now to FIGS. 2A–2L, a detailed circuit schematic of the digital portion of a preferred embodiment of the present invention is shown. FIG. 3. illustrates how FIGS. 2A–2L should be arranged to form the detailed circuit schematic of the digital portion of the present invention.

The detailed circuit schematic of FIGS. 2A–2L is included for the purpose of providing a complete description of a preferred embodiment of the present invention. However, since a recital of every component and interconnection thereof would unduly encumber the description, only the essential details of the circuit schematic will be discussed hereinafter.

To the left-hand side of FIG. 2A is shown connector P1 which comprises the various address, data, and control signals present on the system bus 1.

Shown in FIGS. 2A and 2B is the 24-bit local address bus 5, as well as the address and A.M. decoder logic circuits. In FIG. 2B the function of arbitrating between the system bus 1 and digital-to-analog conversion circuits 30–37 is performed by programmed array logic (PAL) devices PAL 1 and PAL 2. The function and programming of the PAL devices is discussed in greater detail below.

Figure 2C:
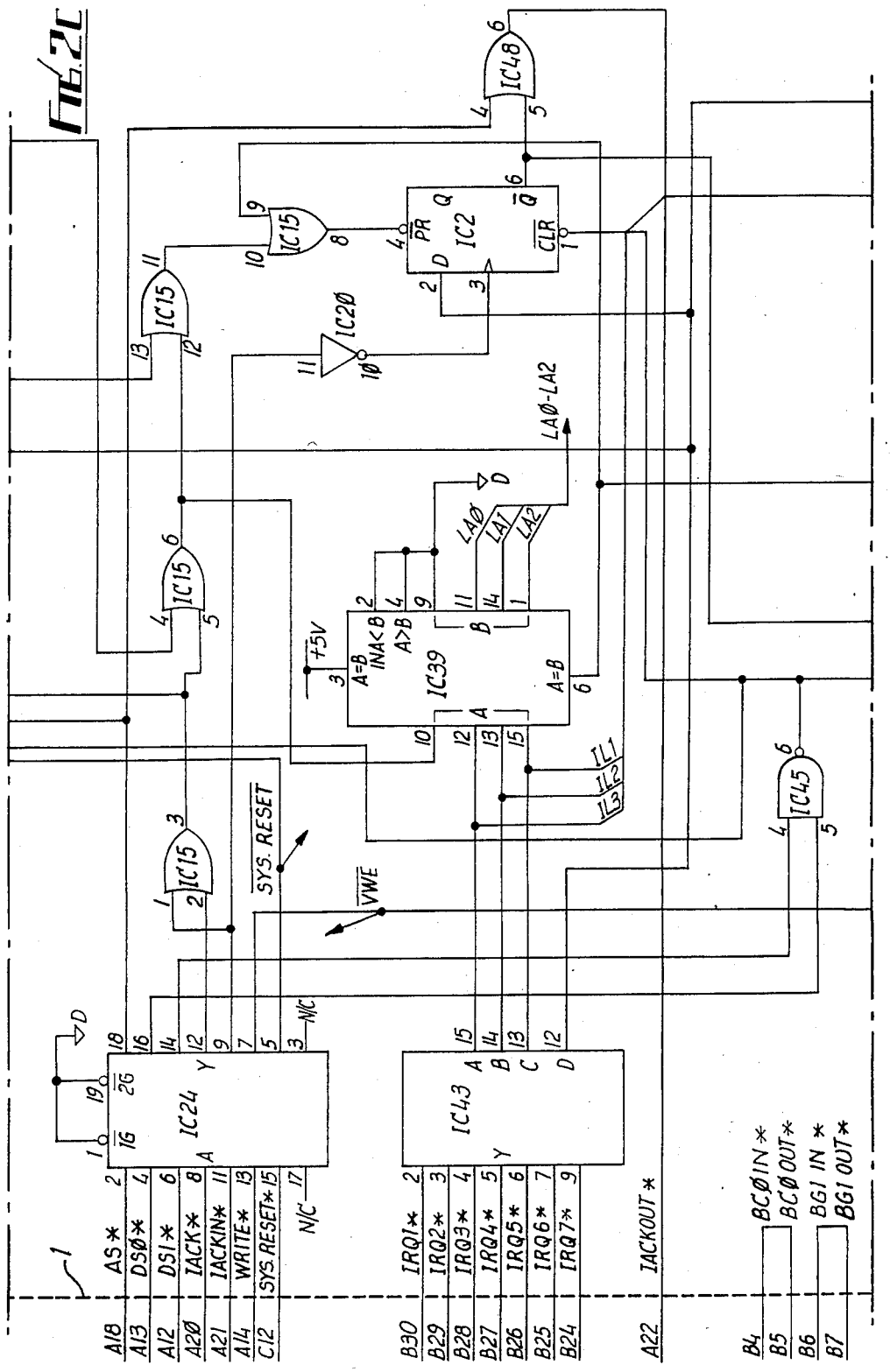

FIG. 2C shows the logic for determining the interrupt levels in the form of IC43 and IC39, and the associated interrupt output lines IRQ1*–IRQ7*.

Figure 2D:
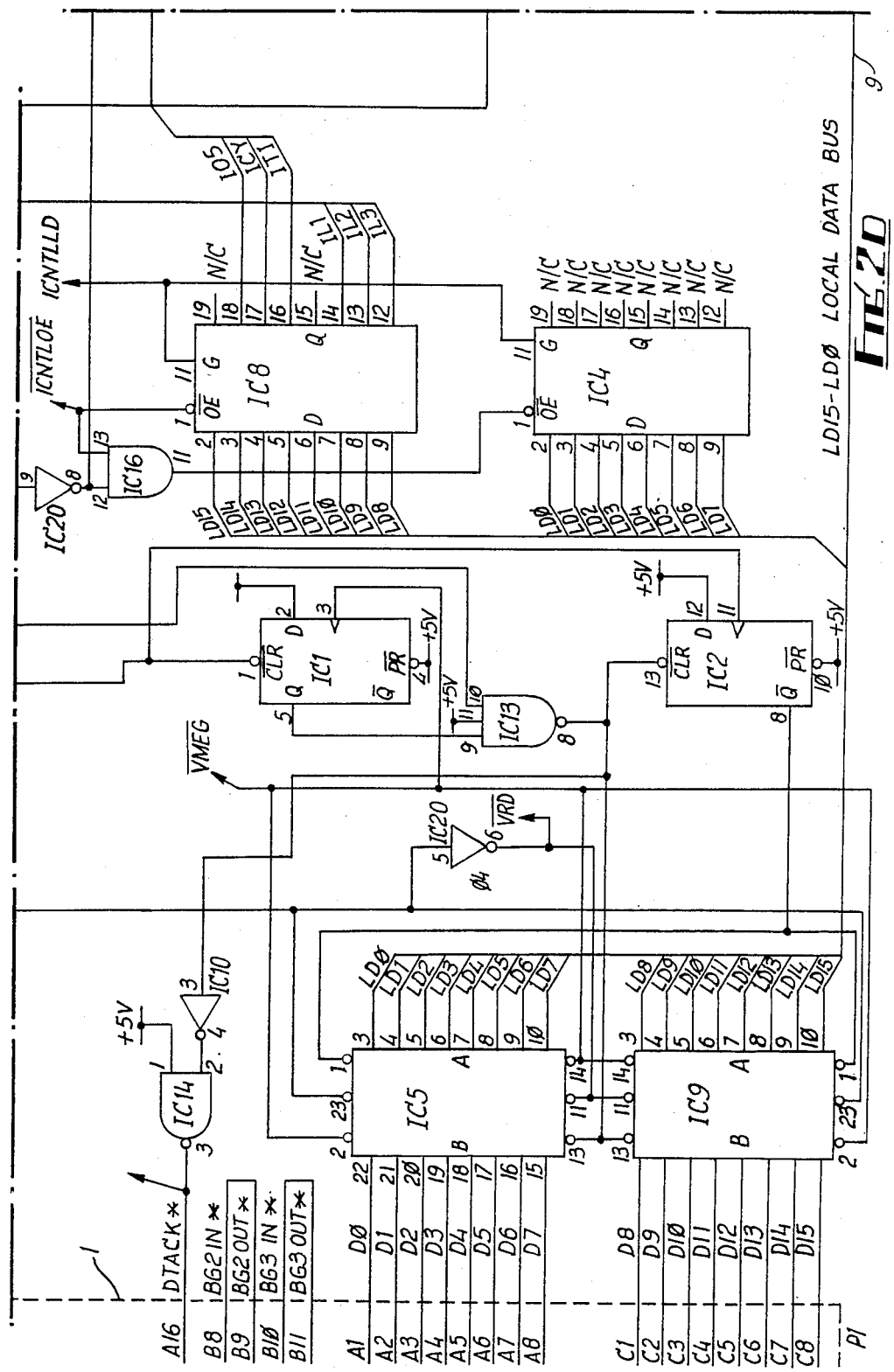

FIG. 2D shows the data latches IC5 and IC9 and associated data input lines D0–D15. Also shown is the local data bus 9, the interrupt control register in the form of IC8, and the status i.d. byte register in the form of IC4.

Figure 2E:
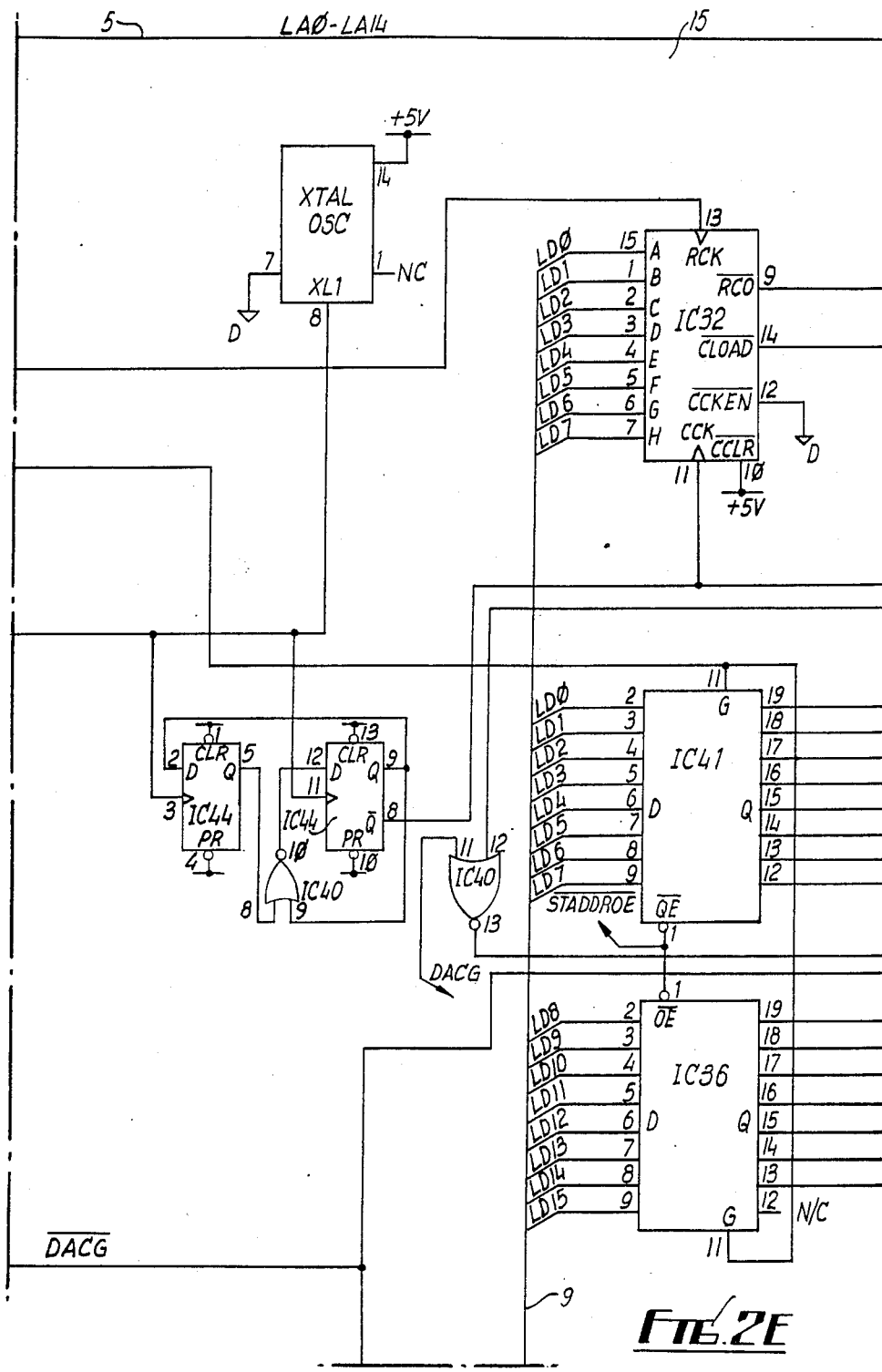

FIG. 2E shows the external crystal oscillator XL1 and the rate timer in the form of IC32. IC41 annd IC36, together with IC50 and IC46 in FIG. 2H, constitute the start address register.

FIG. 2F shows the stop address register in the form IC17, IC27, IC11, and IC22.

Figure 2G:
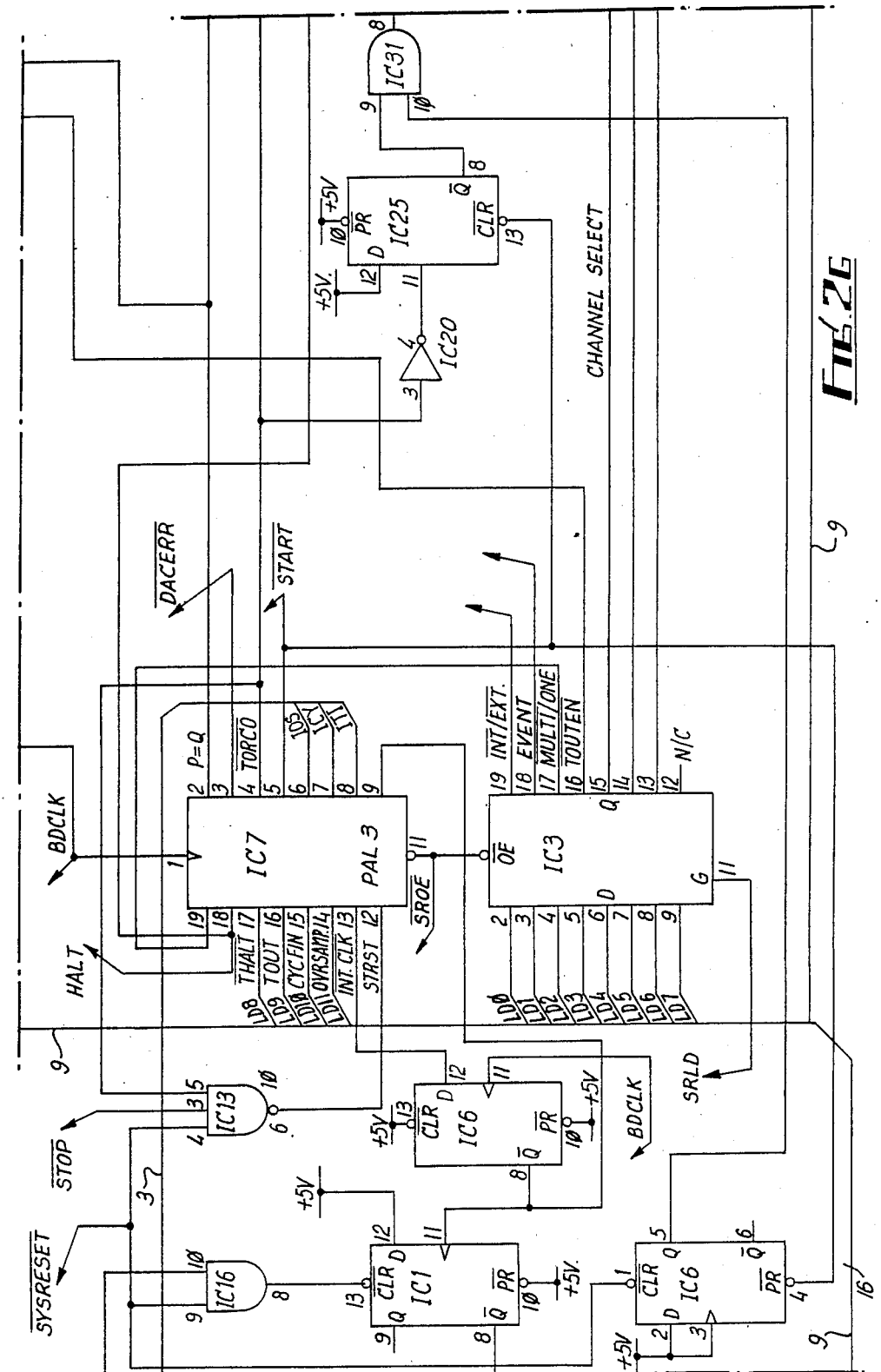

FIG. 2G shows the control register in the form of PAL 3.

FIG. 2G also shows the status register in the form of IC3.

Figure 2H:
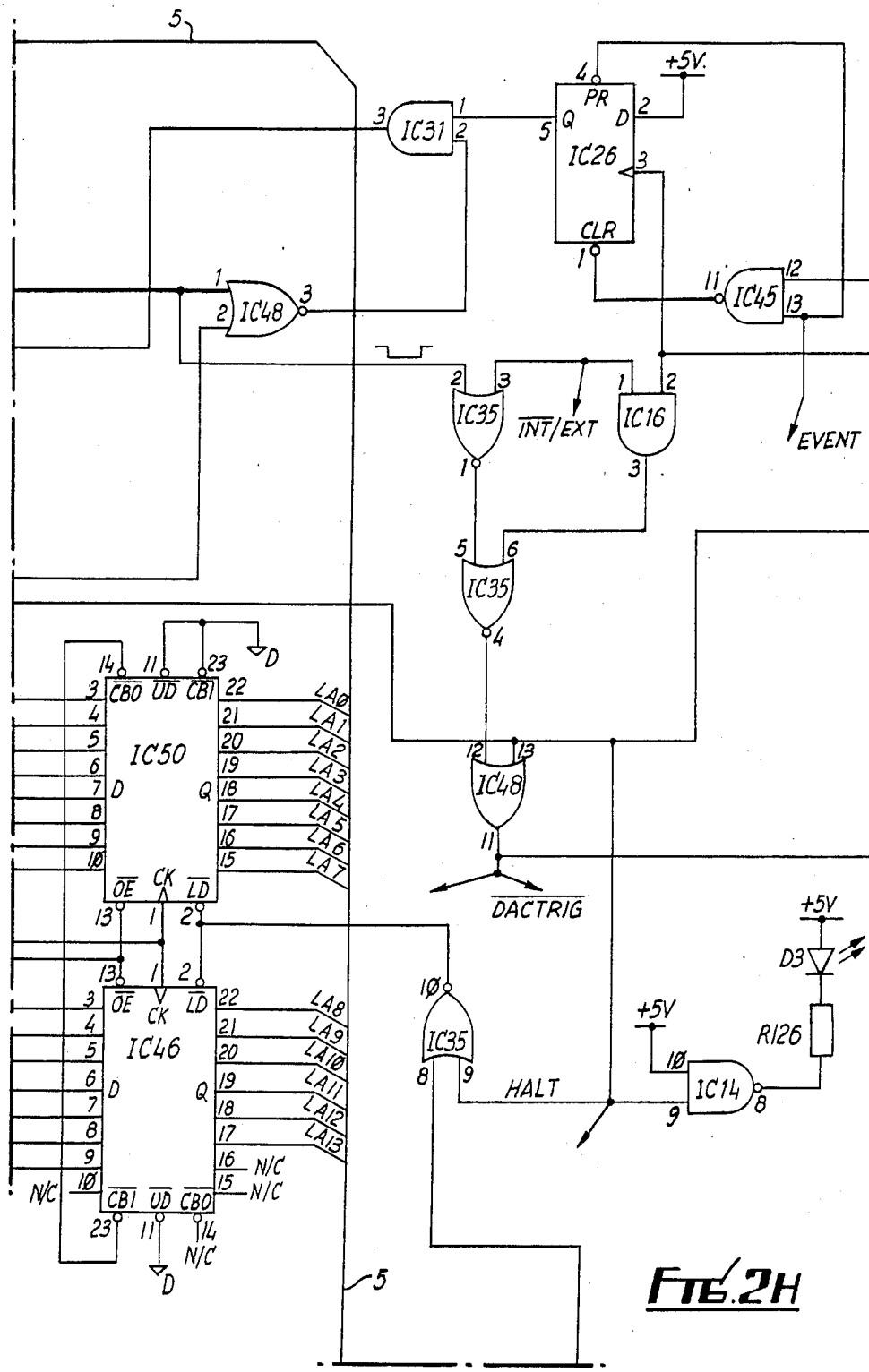
Figure 21:
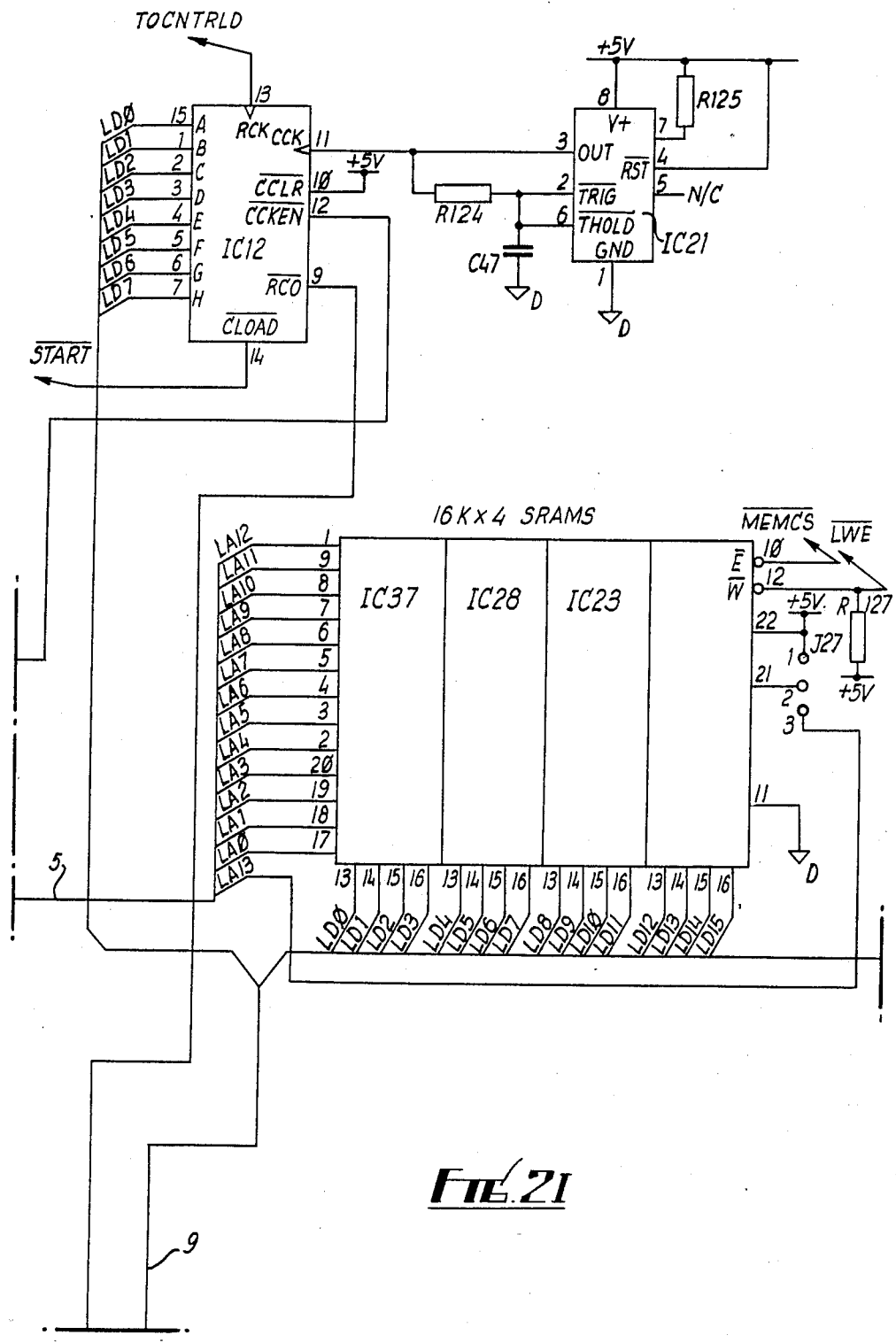

In FIGS. 2H (upper right) and 2K (upper left) the trigger logic is shown in the form of IC48, IC31, IC26, IC35, IC48, IC16, IC45, IC14, transistor TR1, diodes D1 and D2, and associated resistors and conductors.

FIG. 2I shows the watchdog timer circuit in the form of IC12, the programmable clock generator in the form of IC21, and the 16K×16 static RAM comprising IC37, IC28, IC23, and IC__.

Figure 2J:
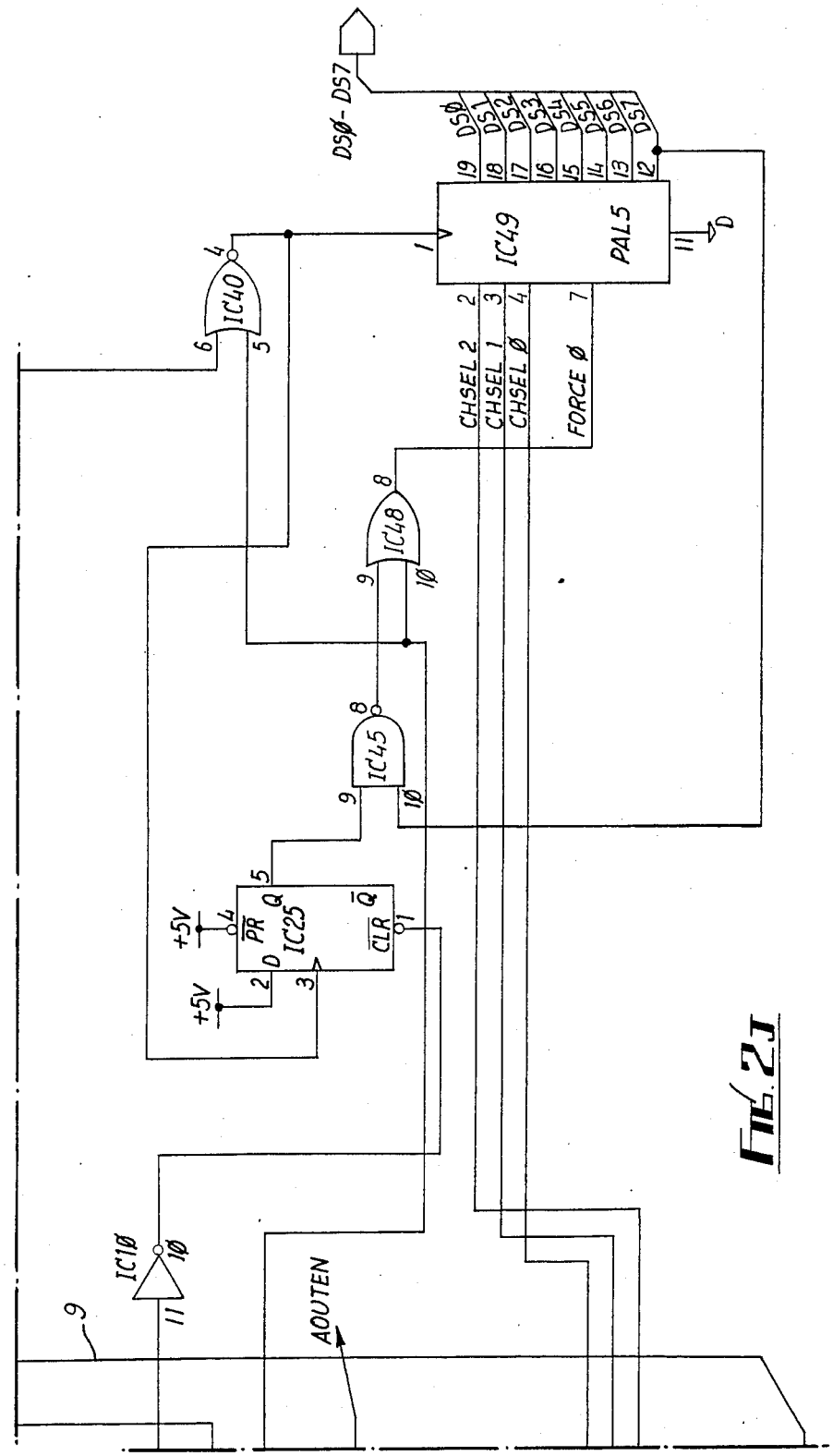
Figure 2K:
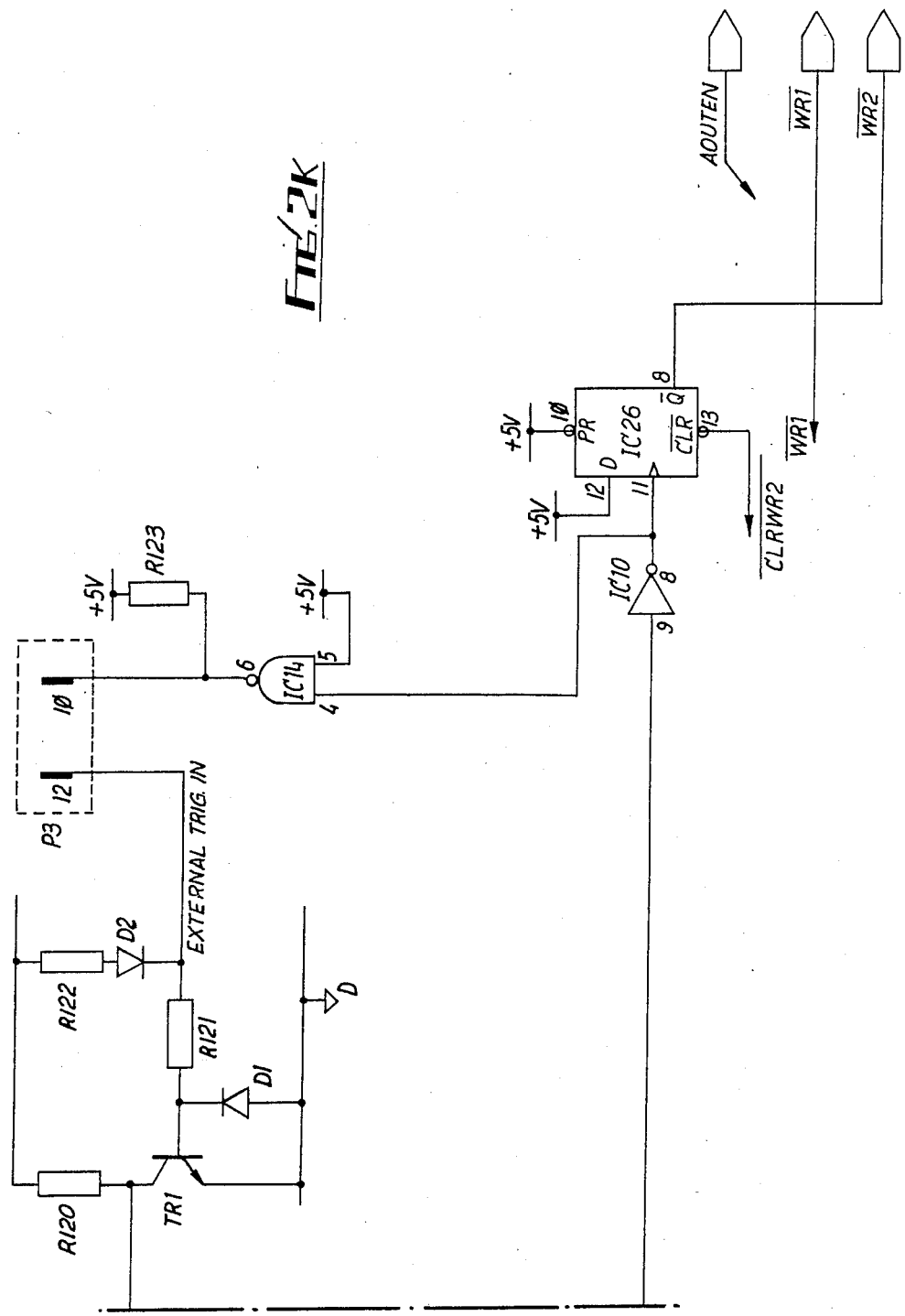

FIG. 2J shows the channel select circuit in the form of PAL 5.

Figure 2L:
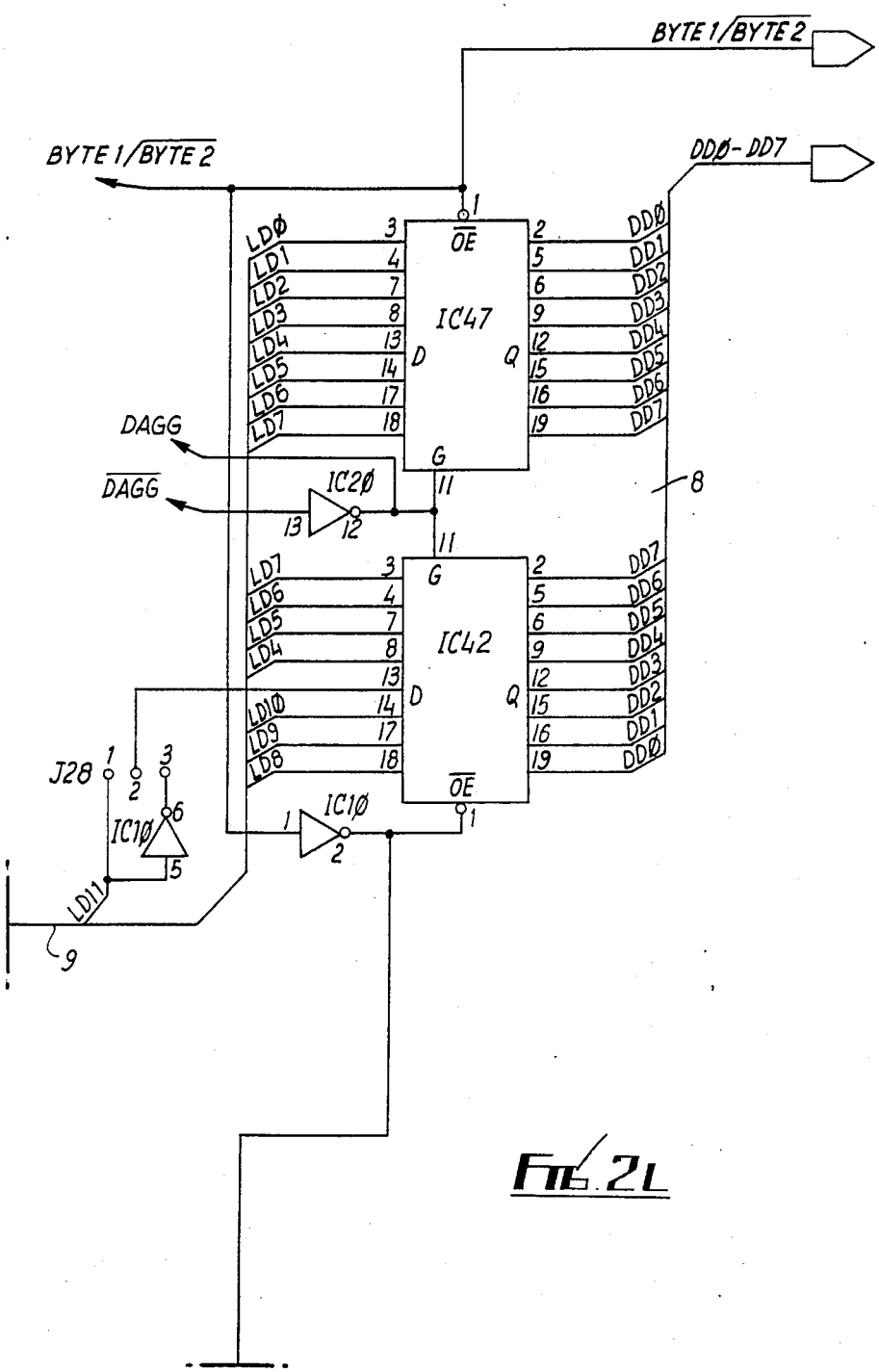

FIG. 2L shows the output latches in the form of IC47 and IC42.

Figure 4:
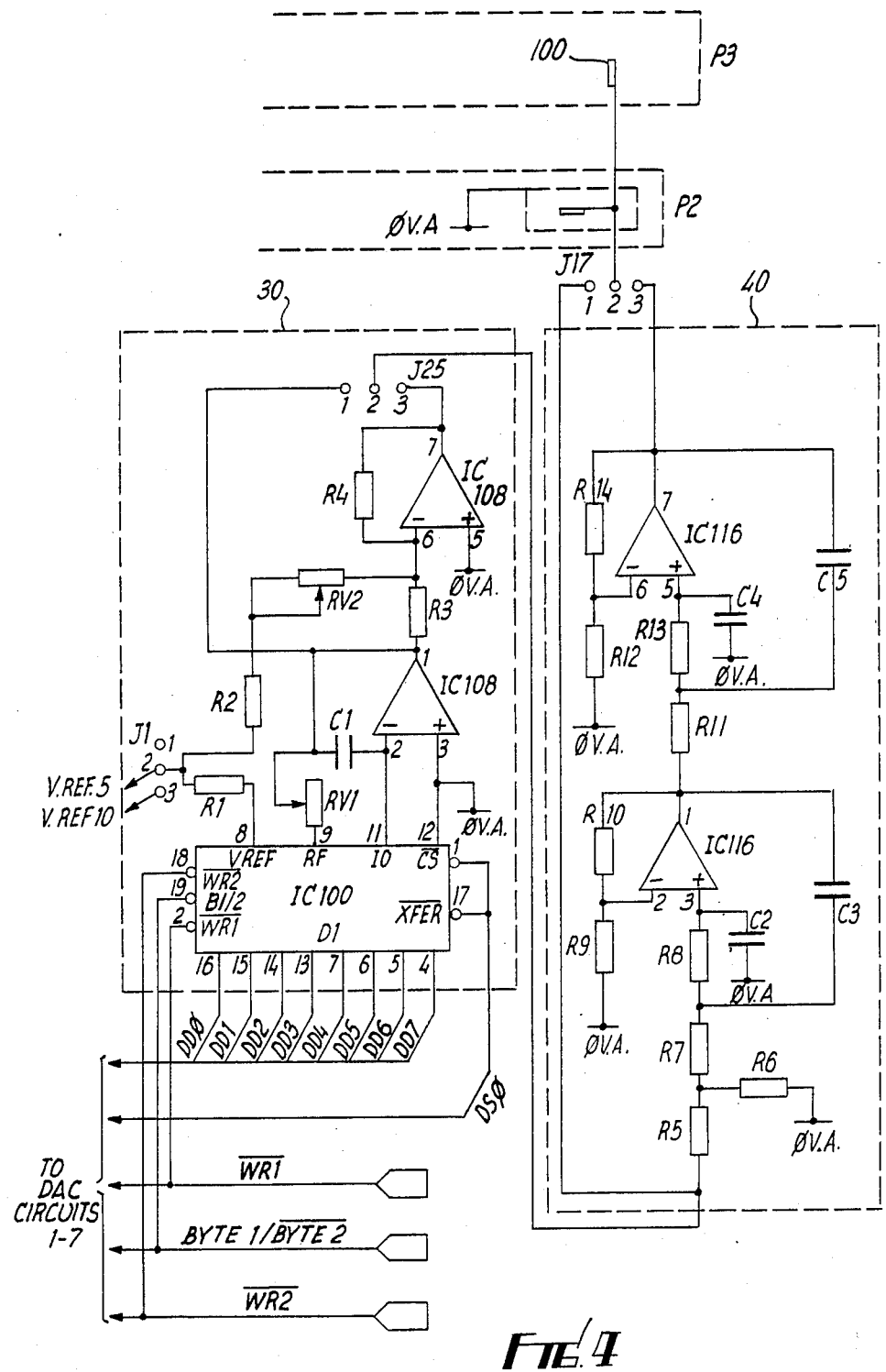
FIG. 4 shows a detailed circuit schematic of a representative analog output channel of a preferred embodiment of the conversion system of the present invention.

Referring now to FIG. 4, a detailed circuit schematic of DAC circuit output channel 0 according to a preferred embodiment of the invention is shown. It will be understood that the circuit of FIG. 4 is duplicated for the remaining DAC circuit output channels 1–7, each channel comprising one of the DAC circuits 31–37 and one of the reconstruction filters 41–47.

In FIG. 4 the digital-to-analog conversion circuit 30 lies within the dotted line and comprises DAC IC100 as its primary component and, in addition, a pair of IC108 circuits and related resistors, variable resistors, capacitors, and jumper connections. Regarding jumper J1, a −5 volt supply voltage is provided to terminal 1, and a −10 volt supply voltage is provided to terminal 3. Regarding jumper 25, terminal 1 provides a unipolar output, and terminal 3 provided a bipolar output.

Still referring to FIG. 4, the reconstruction filter circuit 40 lies within the dotted line and comprises a pair of IC116 circuits and related resistors and capacitors. Regarding jumper 17, the desired analog output signal appears on terminal 100 of connector P3.

FIG. 5 shows a voltage reference supply circuit for providing the −5 volt and −10 volt supply voltages required by the circuits illustrated in the schematics of FIGS. 2 and 4. The −5 volt supply is provided on conductor 67, and the −10 volt supply is provided on conductor 68.

Referring now to FIG. 6, an additional voltage reference supply circuit for the analog portion of the present invention is shown. A DC-to-DC converter circuit (IC79) is connected to +5 volts via conductor 71 and to ground potential via conductor 72, which conductors are coupled to appropriate terminals of connector P1. The circuit provides a +15 volt output on conductor 73, ground potential on conductor 74, and a −15 volt output on conductor 75.

Also seen in FIG. 6 is a representative DAC IC100, of which terminal 20 is connected to +15 volts, of which terminal 10 is connected to digital ground, and of which terminal 3 is connected to analog ground.

OPERATION OF PREFERRED EMBODIMENT

Address Map

The conversion system of the present invention is viewed from the VME system bus 1 as a 64 kilobyte (64K) block of memory whose base address is jumper-selectable in the entire 16 megabyte address range of the VME system bus 1 on 64 kilobyte boundaries. The analog output has a resolution of 12 bits; therefore, word accesses are required to the conversion system.

Figure 7:
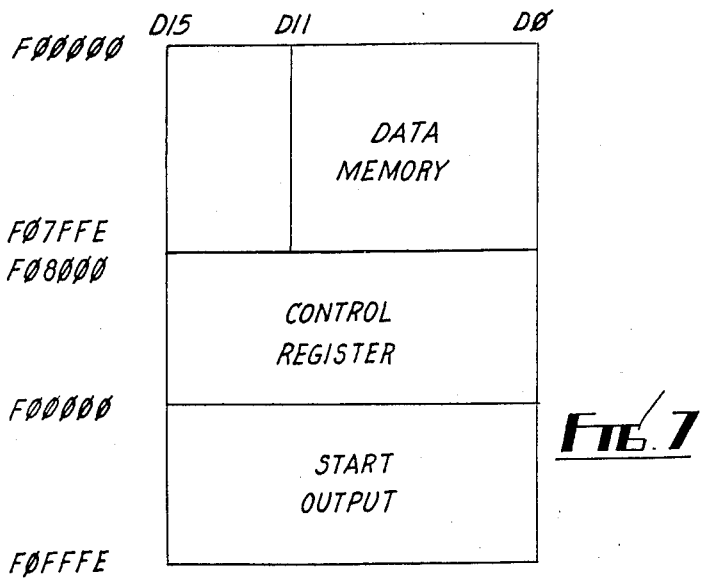
FIG. 7 shows a memory map of the conversion system of the present invention.

Referring now to FIG. 7, a memory map of the digital system bus-compatible analog output system of the present invention is shown. The base address is jumper-selectable. In general, the conversion system is read from and written into by a CPU (not shown) connected to the system bus 1. The system CPU writes data words to be converted into analog voltages into the RAM memory 8. The system CPU also writes control information into the control registers of the conversion system in order to establish the operating modes. Finally, to start the actual conversion the system CPU reads or writes to the last quarter of the memory map, which quarter constitutes the start register.

In a preferred embodiment of the invention, the data memory portion of the memory map is 16384 (16K) words. Each memory word is mapped to a 16-bit address on the system bus 1. However, the data memory of the conversion system is only 12 bits wide, so the mapping is organized so that the four most significant bits of the system bus 16-bit word are ignored by the conversion system. Reading from and writing to these bits, represented by the cross-hatched area in FIG. 7, has no effect.

Control Registers

Figure 8:
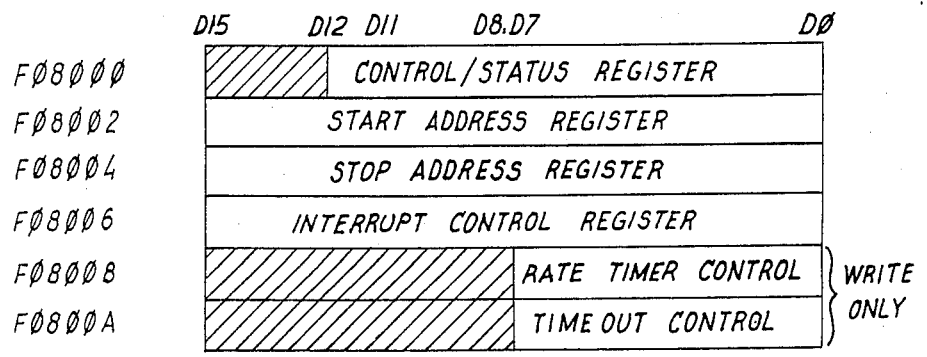
FIG. 8 shows format and memory location of various control registers of the conversion system of the present invention.

Referring now to FIG. 8, the format and memory location of various control registers of the digital system bus-compatible analog output system of the present invention are shown. The control registers of the conversion system appear between addresses F08000 (hex) and F00000, one such register appearing every 16-byte interval.

Address Decoder

The address decoding circuit 4 of the conversion system decodes the address lines of the system bus 1 and decides whether or not the system CPU (not shown) is addressing it. It also assists in accessing the various registers of the conversion system.

In general, an 8-bit magnitude comparator (IC21) compares the address bits A23–A16 of the system bus 1 with the jumper-selectable value 525. If both bytes are identical, then a LOW from the $\overline{P=Q}$ output indicates that the base address of the conversion system is correct. This LOW is gated with a LOW from the correctly decoded address modifier (A.M.) PROM IC13, producing a HIGH as an input to IC20, indicating that the conversion system is being addressed properly.

IC39 is a combinational PAL which decodes the local address lines LA0, LA1, LA2, LA13, and LA14, to decide into which register that data on the local data bus 9 should be loaded. IC33 is a 3-to-8 decoder which is used to enable data already stored in the control register back onto the local data bus 9 in order to examine its contents.

Control/Status Register

Figure 9:
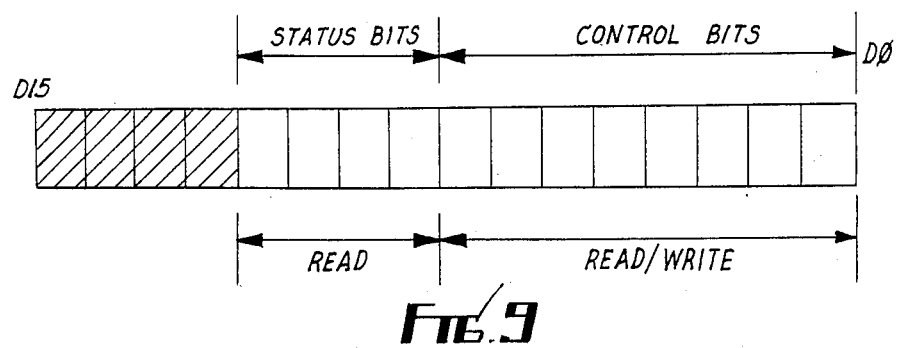
FIG. 9 shows the format of the control/status register of the conversion system of the present invention.
Figure 15:
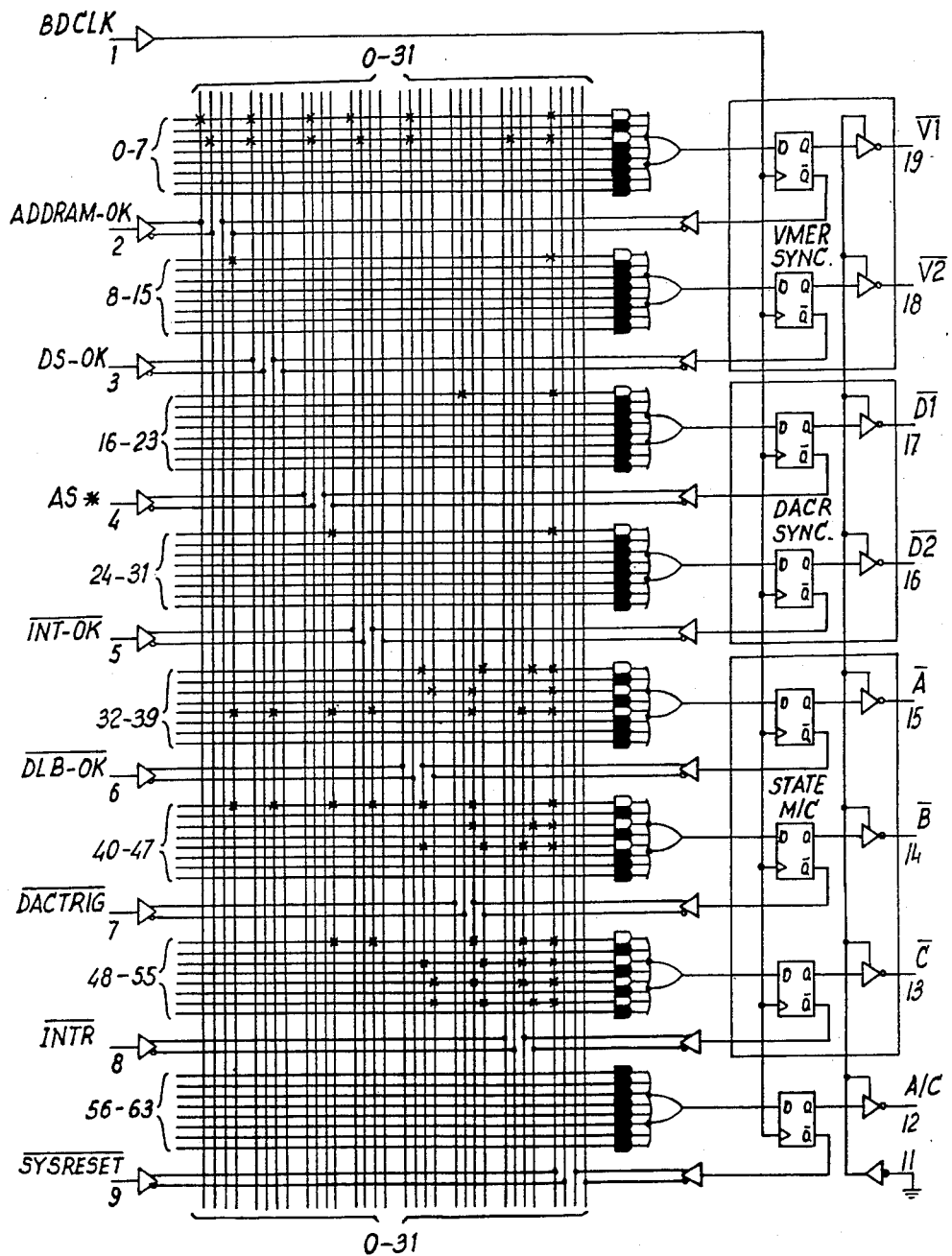
FIG. 15 shows a fuse map for the PAL 1 (programmable array logic) device.
Figure 16:
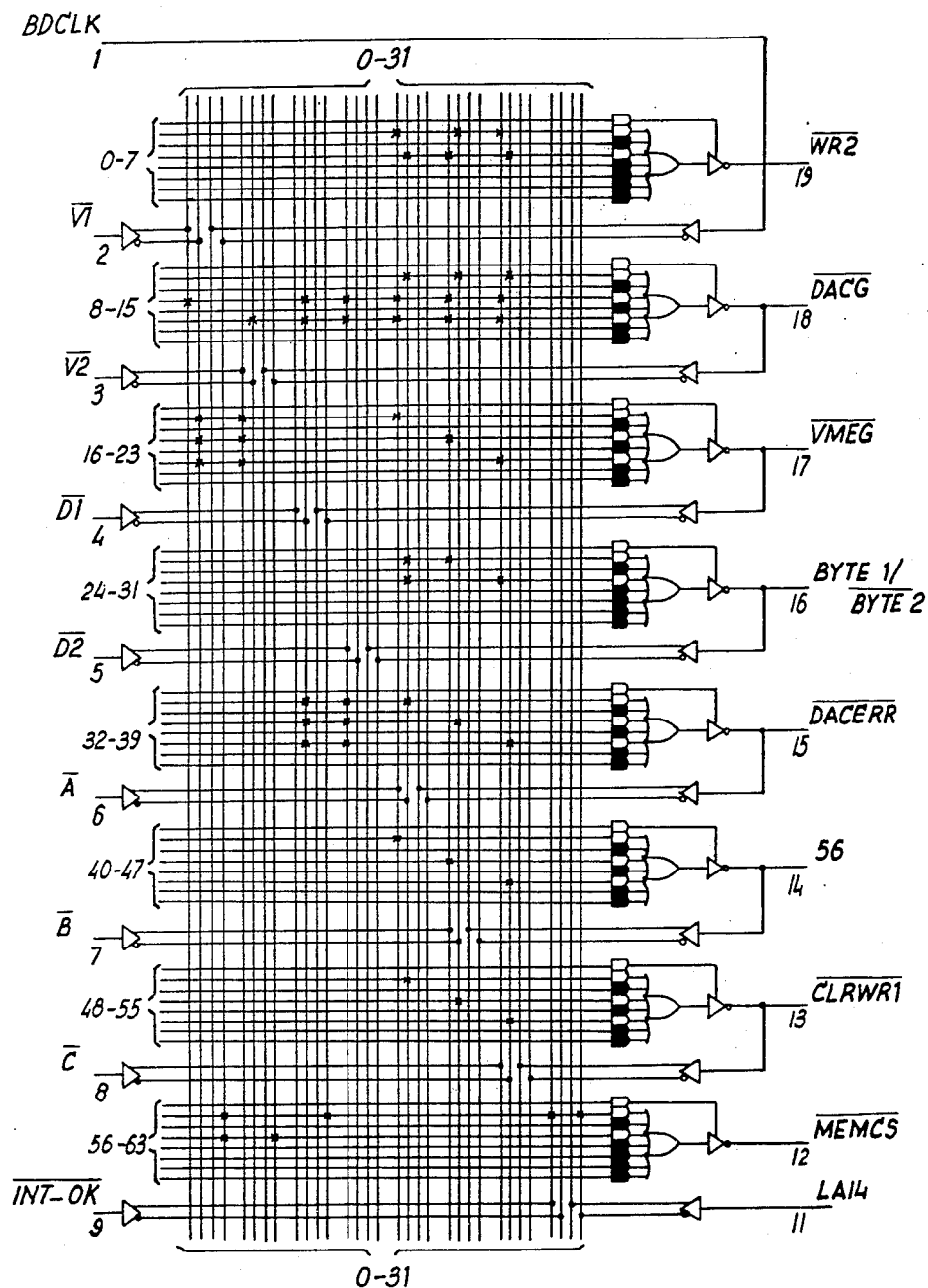
FIG. 16 shows a fuse map for the PAL 2 (programmable array logic) device.
Figure 17:
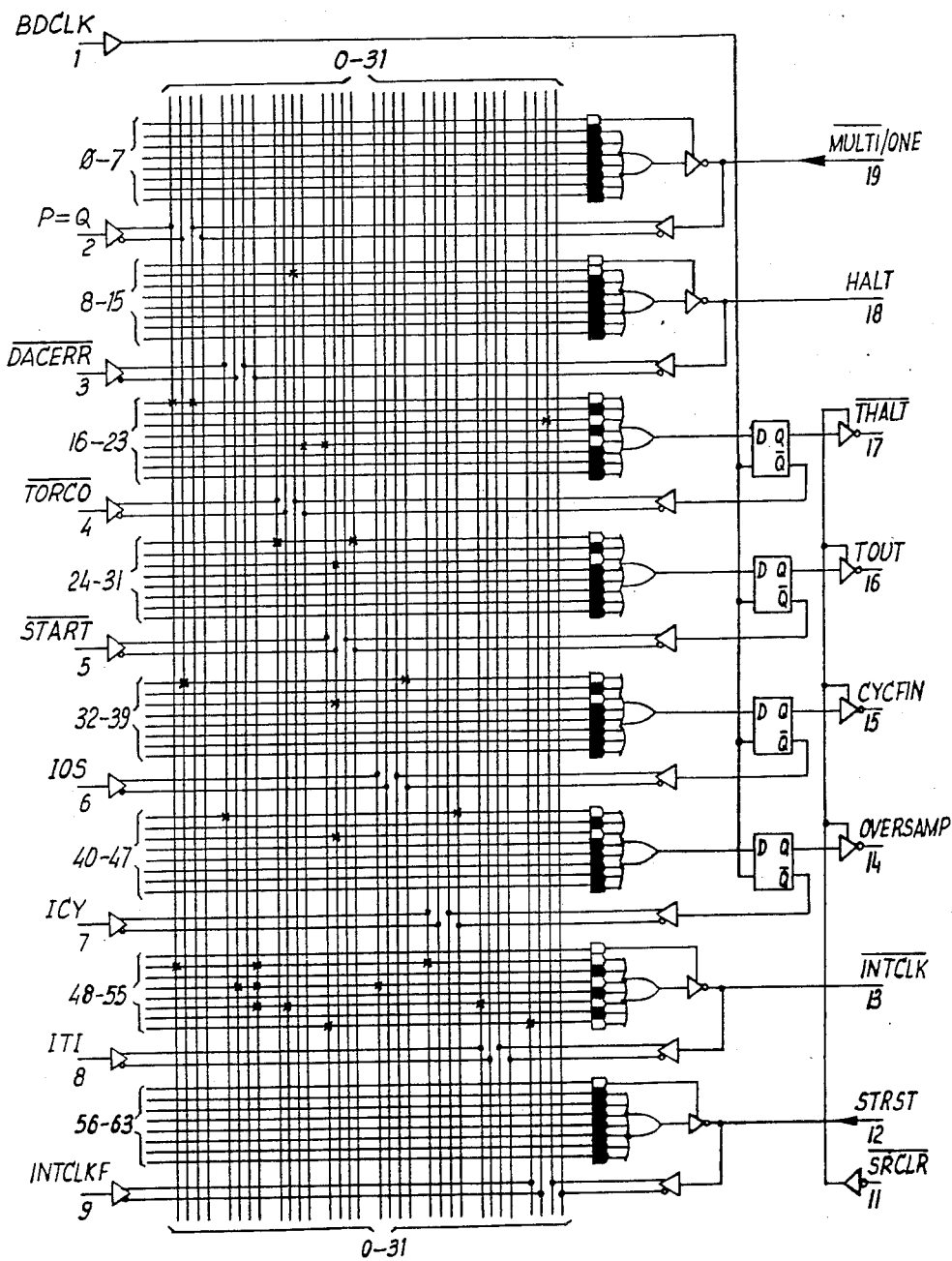
FIG. 17 shows a fuse map for the PAL 3 (programmable array logic) device.
Figure 18:
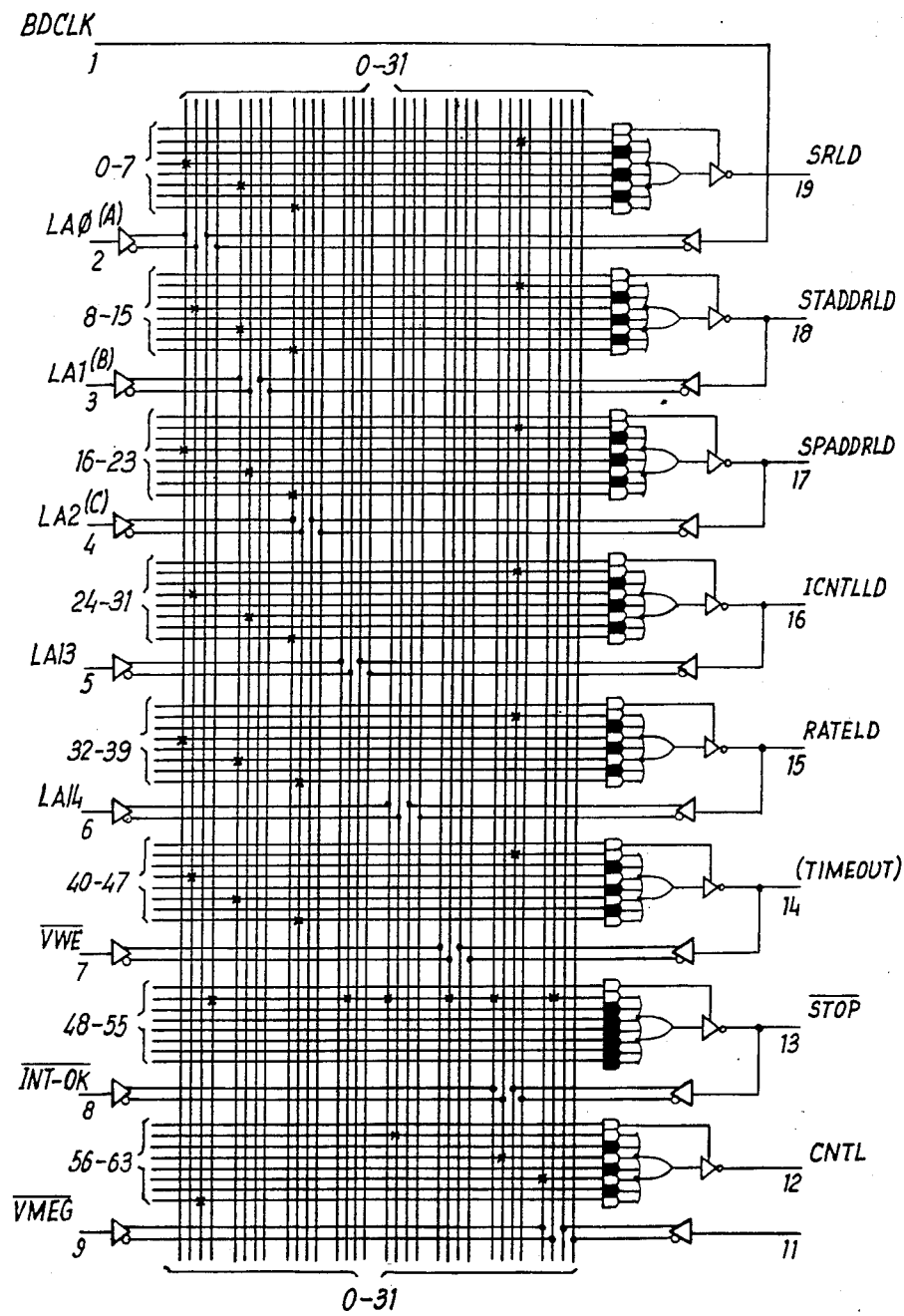
FIG. 18 shows a fuse map for the PAL 4 (programmable array logic) device.
Figure 19:
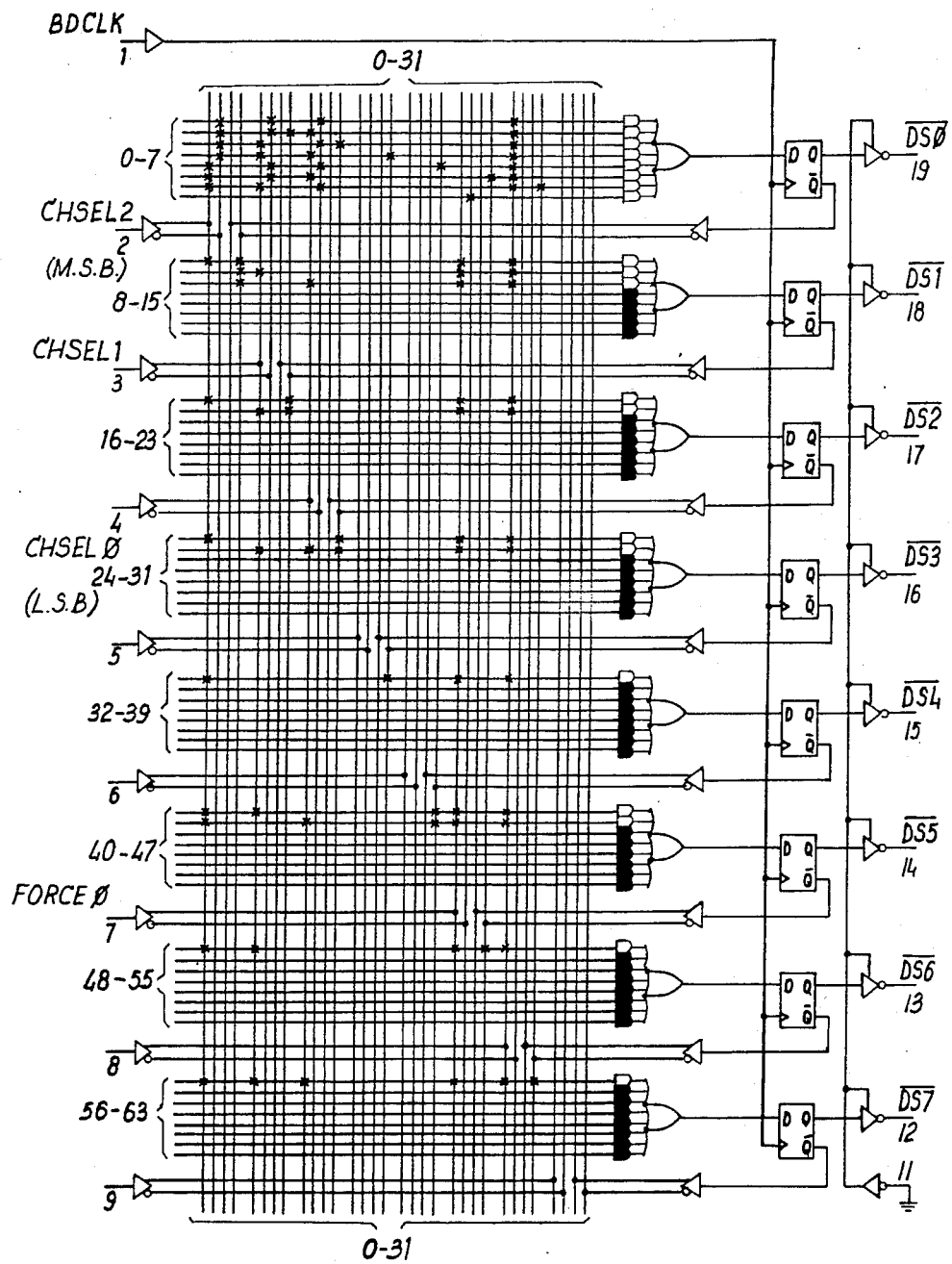
FIG. 19 shows a fuse map for the PAL 5 (programmable array logic) device.

Referring now to FIG. 9, the general format of the control/status register 18 of the conversion system of the present invention is shown.

The control register IC12 is an 8-bit latch/register with readback. This register controls the major operations of the conversion system which include: (1) internal/external trigger, (2) normal event trigger, (3) continuous/one-shot mode, (4) enable/disable watchdog timer register, and (5) number of channels selected.

The status register IC11 is a programmed array logic device (PAL) which is arranged in such a way as to enable the four status bits into the data bus at the same time as the eight control bits are on the data bus. These bits are "read only".

Referring now to FIG. 10, the individual bit positions of control/status register 18 are shown in greater detail. The function of bit positions D0–D15 is as follows:

D0=internal or external trigger select. When this bit is reset to zero, data is input from the conversion system at a rate set by the on-board timer. When D0 is set to one, data is clocked out by a negative-going edge on the external trigger input.

D1=event trigger. When this bit is set to one, a single negative-going edge on the external trigger input initiates a series of outputs under control of the on-board timer. Note that if this bit is set to one while the external trigger is selected (D0=1), the conversion system will be in an undefined state.

D2=continuous or one-shot mode select. When this bit is reset to zero, data contained in the RAM 8 is continuously output through the DAC's until the conversion system is stopped by the system CPU. When D2 is set to one, the conversion system outputs data only once from RAM 8 and then stops.

D3=timeout enable. If this bit is reset to zero, the on-board watchdog timer is enabled. If D3 is set to one, the watchdog timer is disabled.

D4–D6=output channel select bits. The bit pattern of these three bits selects the channel(s) on which analog data is output. FIG. 11 illustrates how the output channel is selected as a function of the channel select bit values.

D7=unused.

D8=halt. This bit is not writeable, but it is reset to zero by the conversion system on power-up, upon application of a SYSRESET signal, or if the conversion system stops updating the DAC's for any reason. The halt bit is set to one (i.e. inactive) once the conversion system starts outputting analog signals.

D9=timeout. This bit is not writeable. It is set to one when the watchdog timer "times out", i.e. when the predetermined timeout interval has elapsed. This bit is reset to zero when the start register is written to.

D10=cycle finished. This bit is not writeable, but it is set to one by the conversion system once a complete set of data has been output through the DAC's. D9 is reset to zero when the conversion system is restarted, i.e., when the start register is written to.

D11=over-sampling. This bit is not writeable. D11 is set to one by the conversion system if the DAC's are supplied with "convert" commands faster than their highest output rate (approximately 857 KHz), i.e. when the on-board rate timer or the external trigger input is running too fast.

D12–D15=unused. Reading or writing to these bits has no effect upon the conversion system.

Start Address Register and Stop Address Register

The conversion system of the present invention has up to 16K words of data memory storage in RAM 8. Data may be written into or read from anywhere in RAM 8 at any time. However, the portion of RAM 8 from which the DAC's 30–37 read the digital data to be converted is set by two registers: the start address register and the stop address register.

The start address register contains the address of the first data word to be output by the DAC's. D-type latch IC32 holds the low address byte, and latch IC31 holds the high address byte. These are held until a change in the starting address is required. The two-byte value held by IC's 32 and 31 is loaded into IC30 (low byte) and IC29 (high byte), which are 8-bit up/down counters that are incremented from the start address value upon each clock cycle.

The stop address register contains the address of the last data word to be output. The stop address is loaded into D-type latch IC38 (low byte) and latch IC37 (high byte) in one operation. This value is held in IC38 and IC37 until it is required to be changed. The value held by IC38 and IC37 is then compared to the incremented value from IC30 and IC29, by IC36 and IC35, respectively. Thus, when the start address has been incremented until it equals the stop address, the outputs of IC36 and IC35 assert themselves LOW, to indicate that the stop address has been reached.

It should be noted that the addresses contained in these registers are word addresses, not byte addresses on the system bus 1. For example, if it is desired to output four data words, starting from the third data memory location, then 0003 (hex) should be written to the start address register, and 0006 should be written to the stop address register. This is illustrated in FIG. 12.

It should also be noted that, with 16K words of RAM 8 memory, the value of the most significant two bits of both registers has no effect upon the conversion system, even though these bits can be read from and written to.

In normal operation, the value of the contents of the stop address register is greater than the value of the contents of the start address register. However, if the two values are equal, then the conversion system will output the data word at that address but no other data words. If the stop address is smaller than the start address, then the addresses of the data words output will "wrap around" to zero and increment until the stop address is reached.

Interrupt Control Register

Referring now to FIG. 13, the format of the interrupt control register of the conversion system of the present invention is shown. The interrupt control register is software programmable to control the interrupt priority, the interrupt/status i.d. byte, and the type of event generating the interrupt.

All fields in the interrupt control register are read/write and are defined as follows:

D0–D7=the status/i.d. byte. This field is the byte which is supplied to the system bus 1 interrupt handler (not shown) during an interrupt acknowledge cycle.

D8–D10=interrupt priority. These three bits determine which one of the seven interrupt lines the conversion system utilizes the request an interrupt. FIG. 14 illustrates how the interrupt priority is selected as a function of the interrupt priority bit values.

D11=not used.

D12–D14=interrupt enable bits. There are three possible sources of interrupts: (1) an "over-sampling" condition, (2) a watchdog time-out, and (3) an output cycle complete condition. These three states correspond to the setting of one of bits D11, D9, and D10, respectively, of the control/status register. The generation of an interrupt on entering one or several of these states is individually programmable via bits D12, D13, and D14 of the interrupt control register.

D15=not used.

When bit D12 of the interrupt control register (ITI) is set to one, an interrupt is generated by the watchdog timer timing out. If bit D13 (ICY) is set to one, an interrupt is generated when an output cycle is complete. Similarly, an interrupt is generated when the DAC's are over-sampled, and bit D14 (IOS) is set to one.

Note that if more than one of these bits is set to one, then an interrupt is generated on entering any of the states which have interrupts enabled. The generation of an interrupt can be expressed by the following Boolean equation:

$$\text{Interrupt} = ITI.(\text{Timeout}) + ICY.(\text{Cycle Finished}) + IOS.(\text{Oversampling})$$

The interrupt control register function is performed by IC 25. The function of IC11 is to check that the interrupt generated by the conversion system is one which must be responded to.

During the interrupt acknowledge cycle, the level of interrupt being serviced is indicated by address lines A01, A02, and A03. This address information is compared to the generated interrupt level by a four-bit magnitude comparator IC45, and if the service levels are the same, the interrupt control word held in IC26 is enabled onto bits D00–D07 of the internal data bus 9.

Rate Timer Register

The rate at which fresh analog data is output from the conversion system is controllable using this write-only register. It should be noted, however, that to use this feature the internal trigger must be enabled; i.e., bit D0 of the control/status register is reset to zero.

In a preferred embodiment, the output rate is programmable in 500 nanosecond increments from 0 to 127.5 microseconds; however, setting the output rate of 0, 0.5, or 1 microsecond will produce an oversampling indication.

The rate timer is implemented as an 8-bit up-counter IC19, the eight bits of the counter being mapped into the least significant byte of the counter. The counter produces a DAC trigger pulse on reaching FF (hex). Therefore, writing FFFE to the counter results in an output rate of $1 \approx 0.5$ microseconds (2 MHz). The timer counts once, outputs a pulse, is reloaded with FE and repeats, again and again. Similarly, writing FFFD results in an output rate of 1 MHz. The formula for calculating the output period for a certain value in the rate timer register is:

Output Rate=(255−(Register Value))×500 microseconds

Writing the value FFFF in the rate timer register is not recommended, since it represents sampling period of 0 seconds.

Watchdog Timer Register

The watchdog timer register may be programmed with a predetemined time period, such that if the time period expires without an access being made to the start address register then the analog outputs are forced to zero volts. The purpose of the watchdog timer register is to enhance the reliability and fault tolerance of the conversion system.

The timeout feature can be disabled by setting bit D3 of the control register HIGH, thus disabling the clock input to the control register and making more than one start access unnecessary.

Like the rate timer, the watchdog timer is implemented as a write-only 8-bit up-counter IC18. The eight bits of the counter are mapped to the least significant byte of the counter. The counter counts in units of approximately 0.95 seconds. Thus, loading the timeout control register with a value of FFFE (hex) results in a timeout after 0.95 seconds. The formula for calculating the timeout interval for a certain value in the timeout control register is as follows:

Timeout Interval=(255−(Register Value))×0.95 seconds

Power-Up and System Reset

The analog outputs are normally forced to zero volts upon power-up, upon application of a $\overline{SYSRESET}$ signal, or upon timeout of the watchdog timer. This is to provide a certain amount of protection for devices or instruments being driven by the conversion system analog outputs, against possible transients during power-up, or against failure of the system bus. Normally, the analog outputs are again enabled as soon as the start address register is accessed.

Programmable Array Logic Devices

Five programmable array logic (PAL) devices are utilized in the detailed circuit schematic of a preferred embodiment of the present invention: PAL 1, PAL 2, PAL 3, PAL 4, and PAL 5. The details of the logic functions performed by each PAL will now be discussed in turn.

PAL 1

The function of PAL 1 is to ensure that the system is properly addressed. It also synchronizes the local address bus 5 with the address lines of the system bus 1 and the local data bus 9 with the data lines of the system bus 1. PAL 1 also contains a state machine which, when used in conjunction with PAL 2, controls data bus arbitration and DAC control.

The operation of the state machine of PAL 1 is closely linked to the combinational logic of PAL 2. The PAL 1 state machine is defined by the PAL 1 "Next State" table (refer to Appendix "B-1").

From the "Next State" table for PAL 1, five-variable Karnaugh maps of each output signal are obtained, and from these are derived the Boolean equations for each "Next State" as follows:

$$An+1=\overline{An}\cdot Bn\cdot Cn+An\cdot \overline{Bn}+\overline{Bn}\cdot \overline{Cn}\cdot D1\cdot \overline{D2}\cdot V1\cdot \overline{V2}$$

$$Bn+1=\overline{An}\cdot Bn\cdot \overline{Cn}+\overline{Bn}\cdot Cn+\overline{An}\cdot \overline{Bn}\cdot D1\cdot \overline{D2}\cdot V1\cdot \overline{V2}$$

$$Cn+1=\overline{An}\cdot Bn\cdot \overline{Cn}+An\cdot \overline{Bn}\cdot \overline{C}\text{-}n+An\cdot Bn\cdot Cn+\overline{Bn}\cdot Cn\cdot D1\cdot \overline{D2}$$

The PAL 1 fuse map is shown in Appendix "B-2".

PAL 2

PAL 2 is a combinational logic PAL which is used in conjunction with PAL 1 to control bus arbitration and DAC control. The Boolean equations for the control logic are derived from the "Next State" table of PAL 1 (refer to Appendix "B-1") as follows:

$$VMEG=\overline{An}\cdot V1\cdot \overline{V2}+\overline{Bn}\cdot V1\cdot \overline{V2}+\overline{Cn}\cdot V1\cdot \overline{V2}$$

$$DACG=An\cdot Bn\cdot Cn+\overline{An\cdot Bn\cdot Cn}\cdot V1\cdot D1\cdot \overline{D}\text{-}2+\overline{An}\cdot \overline{Bn}\cdot \overline{Cn}\cdot V2\cdot D1\cdot \overline{D2}$$

$$DACERR=An\cdot D1\cdot \overline{D2}+Bn\cdot D1\cdot \overline{D2}+Cn\cdot D1\cdot \overline{D2}$$

$$\overline{B1/B2}=An\cdot \overline{Bn}+An\cdot \overline{Cn}$$

$$WR2=\overline{An}\cdot Bn\cdot \overline{Cn}+An\cdot \overline{Bn}\cdot Cn$$

$$CLRW1=An+Bn+Cn$$

$$MEMCS=\overline{VMEG\cdot LA14\cdot BDCLK\cdot INT\_OK}+\overline{DACG\cdot BDCLK}$$

The PAL 2 fuse map is shown in Appendix "C-1".

PAL 3

PAL 3 is used as the status register portion of control/status register 18. It controls the interrupt flags through a number of state machines.

The "Next State" tables for the CYCFIN, TOUT, and OVERSAMP variables are shown in Appendix "D-1". The "Next State" table for the THALT variable is shown in Appendix "D-2".

The variable $\overline{INTCLK}$ is used to acknowledge that an interrupt has occurred. The Boolean equation for $\overline{INTCLK}$ is:

$$\overline{INTCLK}=(ICY\cdot HALT\cdot P=Q)+(IOS\cdot HALT\cdot DACERR)+(ITI\cdot HALT\cdot TORCO)$$

The PAL 3 fuse map is shown in Appendix "D-3".

PAL 4

PAL 4 is a purely combinational circuit which is used to decode the local address bus 5 and enable the various registers in order to load and latch in values from the local data bus 5.

The applicable Boolean equations are described below:

"$\overline{CNTL}$" is a signal which enables a 3-to-8 decoder used to read back values held in various registers. $\overline{CNTL}$ is defined as follows:

$$\overline{CNTL}=LA14\cdot VMEG\cdot \overline{(INT\_OK)}\cdot \overline{BDCLK}$$

LA14 is used to decide whether the top or bottom 16K words of RAM memory are being addressed. VMEG means that control is given to the system bus 1. INT_OK indicates no interrupts. $\overline{BDCLK}$ indicates the second half of the clock cycle. Alternatively, this may be expressed:

$$\overline{CNTL} = \overline{LA14} + \overline{(INT\_OK)} + \overline{VMEG} + BDCLK$$

"STOP" is a control signal from PAL 4 signifying that data transfers on the bottom 16K words of memory (control registers) are no longer being performed. $\overline{STOP}$ is defined as follows:

$$\overline{STOP} = \overline{CNTL} \cdot \overline{LA13} \cdot \overline{VWE} \cdot \overline{BDCLK}$$

$\overline{CNTL}$, when asserted LOW, means that the readback function cannot be performed (the Boolean equation for $\overline{CNTL}$ is detailed above). $\overline{LA13}$ not asserted means NOT in the control half of memory. $\overline{VWE}$ enables a write to the system from the system bus 1. $\overline{BDCLK}$ indicates the second half of the clock cycle.

"$\overline{SRLD}$" (Status Register Load) is a combinational logic signal which is mapped by LA0, LA1, and LA2 into the first location in the bottom 16K words. When asserted HIGH, data on the local data bus 9 is loaded into the control register 18. $\overline{SRLD}$ is defined as follows:

$$\overline{SRLD} = \overline{STOP} \cdot \overline{LA2} \cdot \overline{LA1} \cdot \overline{LA0}$$

$$\overline{SRLD} = \overline{STOP} + LA2 + LA1 + LA0$$

"$\overline{STADDRLD}$" (Start Address Load) is mapped by LA0, LA1, and LA2 into the second location in the bottom 16K words. When asserted HIGH, a 16-bit start address is loaded into the start register.

$$STADDRLD = \overline{STOP} \cdot \overline{LA2} \cdot \overline{LA1} \cdot LA0$$

$$\overline{STADDRLD} = \overline{STOP} = \overline{LA2} + \overline{LA1} + \overline{LA0}$$

"$\overline{SPADDRLD}$" (Stop Address Load) is mapped by LA0, LA1, and LA2 into the third location in the bottom 16K words. When asserted HIGH, a 16-bit stop address is loaded into the stop register.

$$\overline{SPADDRLD} = \overline{STOP} \cdot \overline{LA2} \cdot LA1 \cdot \overline{LA0}$$

$$\overline{SPADDRLD} = \overline{STOP} + LA2 + \overline{LA1} + LA0$$

"$\overline{ICNTLD}$" (Interrupt Control Load) is mapped by LA0, LA1, and LA2 into the fourth location in the bottom 16K words. When asserted HIGH, data concerning specific interrupts and the STATUS/ID byte can be loaded from the local data bus 9.

$$\overline{ICNTLD} = \overline{STOP} \cdot \overline{LA2} \cdot LA1 \cdot \overline{LA0}$$

$$\overline{ICNTLD} = \overline{STOP} = \overline{LA2} + \overline{LA1} + LA0$$

"$\overline{RATELD}$" (Rate Load) is mapped into the fifth location in the bottom 16K words. When asserted HIGH, the value at which DAC trigger pulses for internal and external triggers are to be set can be loaded into the rate timer register.

$$\overline{RATELD} = \overline{STOP} \cdot LA2 \cdot \overline{LA1} \cdot \overline{LA0}$$

$$\overline{RATELD} = \overline{STOP} + \overline{LA2} + LA1 + LA0$$

"$\overline{TOCNTRLD}$" (Time Out Control Load) is mapped into the sixth control location, and when it is asserted HIGH, it enables the data on the local data bus 9 to be loaded into the timeout counter.

$$\overline{TOCNTRLD} = \overline{STOP} \cdot LA2 \cdot \overline{LA1} \cdot LA0$$

$$\overline{TOCNTRLD} = \overline{STOP} + \overline{LA2} + LA1 + LA0$$

The PAL 4 fuse map is shown in Appendix "E-1".

PAL 5

PAL 5 is used to select the number of channels and then to cycle through these channels in sequential order. The PAL 5 state machine is shown in the upper portion of Appendix "F-1". The PAL "Next State" table is shown in the lower portion of Appendix "F-1" and in Appendix "F-2".

From the "Next State" table (for PAL 5), six-variable Karnaugh maps of each output signal are obtained, and from these are derived the Boolean equations for each "Next State" as follows:

$$DS0 = (\overline{(HSEL2} \cdot \overline{CHSEL1} \cdot \overline{CHSEL0}) +$$
$$(\overline{An} \cdot \overline{Bn} \cdot Cn \cdot \overline{CHSEL2} \cdot \overline{CHSEL1} \cdot CHSEL0) +$$
$$(\overline{An} \cdot Bn \cdot \overline{Cn} \cdot CHSEL2 \cdot CHSEL1 \cdot \overline{CHSEL0}) +$$
$$(\overline{An} \cdot Bn \cdot Cn \cdot \overline{CHSEL2} \cdot CHSEL1 \cdot CHSEL0) +$$
$$(An \cdot \overline{Bn} \cdot \overline{Cn} \cdot CHSEL2 \cdot \overline{CHSEL1} \cdot \overline{CHSEL0}) +$$
$$(An \cdot \overline{Bn} \cdot Cn \cdot CHSEL2 \cdot \overline{CHSEL1} \cdot CHSEL0) +$$
$$(An \cdot Bn \cdot Cn \cdot CHSEL2 \cdot CHSEL1 \cdot \overline{CHSEL0}) + FORCE0$$

$$\overline{DS1} = (\overline{An} \cdot \overline{Bn} \cdot \overline{Cn} \cdot CHSEL2 \cdot FORCE0) \cdot\\ + (\overline{An} \cdot \overline{Bn} \cdot \overline{Cn} \cdot CHSEL1 \cdot FORCE0) + (\overline{An} \cdot \overline{Bn} \cdot \overline{Cn} \cdot CHSEL0 \cdot FORCE0)$$

$$\overline{DS2} = (\overline{An} \cdot \overline{Bn} \cdot Cn \cdot CHSEL2 \cdot FORCE0) \cdot\\ + (An \cdot \overline{Bn} \quad Cn \cdot CHSEL1 \cdot FORCE0)$$

$$\overline{DS3} = (An \cdot Bn \cdot \overline{Cn} \cdot CHSEL2 \cdot FORCE0) \cdot\\ + (An \cdot Bn \cdot \overline{Cn} \cdot CHSEL1 \cdot CHSEL0 \cdot FORCE0)$$

$$\overline{DS4} = (An \cdot Bn \cdot Cn \cdot CHSEL2 \cdot FORCE0)$$

$$\overline{DS5} = (An \cdot \overline{Bn} \cdot \overline{Cn} \cdot CHSEL2 \cdot CHSEL0 \cdot FORCE0) \cdot\\ + (An \cdot \overline{Bn} \cdot \overline{Cn} \cdot CHSEL2 \cdot CHSEL1 \cdot FORCE0)$$

$$\overline{DS6} = (An \cdot Bn \cdot \overline{Cn} \cdot CHSEL2 \cdot CHSEL1 \cdot FORCE0)$$

$$\overline{DS7} = (An \cdot Bn \cdot \overline{Cn} \cdot CHSEL2 \cdot CHSEL1 \cdot CHSEL0)$$

The PAL 5 fuse map is shown in Appendix "F-3".

General Operation

The digital-to-analog conversion system of the present invention is a high speed, general purpose system which is compatible with the system bus of a digital data processing system, such as the VME bus. In a preferred embodiment the conversion system is an 8-channel, 12-bit resolution system.

The PI connector is used to physically interface the conversion system (bus slave) to appropriate system masters, such as system CPU's (not shown), via the VME bus.

The base address of the conversion system is jumper-selectable. The address capability includes standard or short addressing modes, with or without address modifier codes. Address modifier response is selectable by appropriate programming of an associated PROM (IC13).

The dual-port RAM 8 serves as a data buffer between the system bus 1 and the DAC's 30–37.

The eight analog outputs 100–107 are physically available on the P3 connector, as are a Sync Out signal 55 and an External Trigger signal 57. The outputs are single-ended, filtered, and protected.

The conversion rate of the DAC's 30-37 of the conversion system can be set either by an on-board timer circuit 17 or by the External Trigger signal 57.

The number of channels to be used and the frequency of the conversion timer are selectable via loading of appropriate control words into control register/status register 18.

To set the memory starting address and stop address, separate start address and stop address registers are provided. In addition, to control the transfer of data between the RAM 8 and the DAC's 30-37, two counters are provided. One is for address generation, and the other determines the number of channels in operation.

The conversion system is capable of generating an interrupt on only of seven interrupt request lines IRQ-1*-IRQ7*. All information exchange between the conversion system and the current bus master is via the dual-port RAM 8 annd the memory-mapped control/status register 18.

Interrupts can be generated on any of several selected conditions, including "over-sampling", "time-out", and "conversion complete" conditions.

The conversion system also includes a watchdog timer circuit 50 which sets to zero any output 100-107 which has not experienced a conversion operation within a predetermined period of time. This function is also performed on power-up.

By appropriate loading of a control word into the control/status register 18, the conversion system can be operated such that a conversion takes place as a "one-shot" operation or as a continuous operation.

The basic method of using the conversion system of the present invention is as follows. First the digital data to be converted is conducted from the system bus 1 to RAM 8. Next the required mode of operation is established by loading the control/status register 18 with an appropriate control word. Finally the command to "GO" is given.

The system now waits for a "trigger" signal, either from an on-board source, such as the timer or another event, or from the external trigger. When the trigger signal is received, a new data word is output through the selected DAC's, and another data word is fetched from RAM 8 to be loaded into the DAC's.

It should be noted that the DAC's 30-37 are double-buffered devices having two ranks of data latches. Only the data in the second rank is output, since the first rank is used for storage.

The memory address of the DAC data is generated by a counter in address generator 10. This counter is incremented by one after each trigger up to a limit set in the stop address register. When the limit is reached, the conversion system stops outputting new data (if it's operating in single-shot mode) or immediately starts outputting the same data again (if it's operating in continuous mode). The starting address of the data is set by the start address register.

The period of the internal trigger source is programmable via the rate timer (IC32, FIG. 2E).

When the conversion system is powered up, before the control/status register 18 has been loaded, the analog outputs are set to zero volts. Also, if the watchdog timer feature is enabled, the outputs will be forced to zero unless the system is accessed before the expiration of a predetermined time period.

It will be apparent to those skilled in the art that the disclosed analog output system compatible with a digital system bus may be modified in numerous ways and may assume many embodiments other than the preferred form specifically set out and described above.

What is claimed is:

1. A digital-to-analog conversion system coupled to a digital system bus for converting at least one digital signal input via said bus into an analog signal of proportionate value, said system comprising:
   (a) random access memory means for temporarily storing said digital signal;
   (b) interface means for coupling said random access memory to said bus;
   (c) at least one digital-to-analog conversion circuit coupled to said random access memory means for converting said digital signal into said analog signal;
   (d) control register means coupled to said bus for storing a control word received from said bus;
   (e) a start address register for indicating the starting address in said random access memory of digital signals to be converted, said start address register being coupled to said control register, whereby the informational content said control word determines said starting address; and
   (f) a stop address register for indicating the last address in said random access memory of digital signals to be converted, said stop address register being coupled to said control register, whereby the informational content of said control word determines said last address.

2. A digital-to-analog conversion system coupled to a digital system bus for converting at least one digital signal input via said bus into an analog signal of proportionate value, said system comprising:
   (a) random access memory means for temporarily storing said digital signal;
   (b) interface means for coupling said random access memory to said bus;
   (c) at least one digital-to-analog conversion circuit coupled to said random access memory means for converting said digital signal into said analog signal;
   (d) control register means coupled to said bus for storing a control word received from said bus;
   (e) means for supplying an external trigger signal to said system;
   (f) timing means for generating an internal trigger signal; and
   (g) conversion trigger means for initiating a digital-to-analog conversion operation, said conversion trigger means being coupled to said control register means, whereby the informational content of said control word determines whether said conversion trigger means initiates said conversion operation in response to said external trigger signal or in response to said internal trigger signal.

3. The conversion system as recited in claim 2 and further comprising:
   means for varying the period of said internal trigger signal, said period varying means being coupled to said control register means, whereby the information content of said control word determines the frequency of said conversion operation.

4. A digital-to-analog conversion system coupled to a digital system bus for converting at least one digital signal input via said bus into an analog signal of proportionate value, said system comprising:
(a) random access memory means for temporarily storing said digital signal;
(b) interface means for coupling said random access memory to said bus;
(c) at least one digital-to-analog conversion circuit coupled to said random access memory means for converting said digital signal into said analog signal;
(d) control register means coupled to said bus for storing a control word received from said bus;
(e) at least two interrupt output lines; and
(f) means for generating an interrupt in response to at least one of two predetermined conditions within said system, said interrupt generating means being coupled to said control register means, whereby the information content of said control word determines whether one or both of said predetermined conditions generates said interrupt and determines to which of said interrupt output lines to generate said interrupt.

5. A digital-to-analog conversion system coupled to a digital system bus for converting at least one digital signal input via said bus into an analog signal of proportionate value, said system comprising:
(a) random access memory means for temporarily storing said digital signal;
(b) interface means for coupling said random access memory to said bus;
(c) at least one digital-to-analog conversion circuit coupled to said random access memory means for converting said digital signal into said analog signal;
(d) control register means coupled to said bus for storing a control word received from said bus; and
(e) mode determining means, said mode determining means having a first mode in which said digital-to-analog conversion is halted after said digital signal stored in said random access memory has been converted into said analog signal, and having a second mode in which said digital-to-analog conversion is performed continuously upon the digital signal stored in said random access memory.

6. A digital-to-analog conversion system coupled to a digital system bus, said system bus including a system data bus and a system address bus, for converting at least one digital signal input via said bus into an analog signal of proportionate value, said system comprising:
(a) random access memory means for temporarily storing said digital signal;
(b) interface means for coupling said random access memory to said bus;
(c) at least one digital-to-analog conversion circuit coupled to said random access memory means for converting said digital signal into said analog signal;
(d) control register means coupled to said bus for storing a control word received from said bus;
(e) an internal data bus;
(f) an internal address bus;
(g) means for synchronizing the operation of said system data bus with said internal data bus; and
means for synchronizing the operation of said system address bus with said internal address bus.

7. A digital-to-analog conversion system coupled to a digital system bus for converting at least one digital signal input via said bus into an analog signal of proportionate value, said system comprising:
(a) random access memory means for temporarily storing said digital signal;
(b) interface means for coupling said random access memory to said bus;
(c) at least one digital-to-analog conversion circuit coupled to said random access memory means for converting said digital signal into said analog signal;
(d) a reconstruction filter coupled to the output of said digital-to-analog conversion circuit;
(e) control register means coupled to said bus for storing a control word received from said bus; and
(f) timing means for varying the conversion rate of said at least one digital-to-analog conversion circuit, said timing means being coupled to said control register means, whereby the informational content of said control word controls the operation of said timing means to vary said conversion rate.

8. The conversion system as recited in claim 7, further comprising:
(a) at least two of said digital-to-analog conversion circuit; and
(b) selection means for selecting the number of digital-to-analog circuits to perform a digital-to-analog operation, said selection means being coupled to said control register means, whereby the informational content of said control word determines the number of digital-to-analog circuits selected by said selection means.

9. The conversion system as recited in claim 7 and further comprising:
means for resetting said at least one digital-to-analog conversion circuit after a predetermined time period, said resetting means being coupled to said control register means, whereby the information content of said control word determines said time period.

* * * * *